United States Patent
Wei et al.

(10) Patent No.: US 9,897,702 B2
(45) Date of Patent: Feb. 20, 2018

(54) GENERATION OF LINEAR FEEDBACK SHIFT REGISTER BASED PSEUDO RANDOM NOISE (PRN) SPREADING CODE SEQUENCE FOR GLOBAL NAVIGATION SATELLITE SYSTEM

(71) Applicant: The Boeing Company, Chicago, IL (US)

(72) Inventors: Philip L. Wei, South Pasadena, CA (US); Abraham Hwang, Buena Park, CA (US); Nigel Chen, Etiwanda, CA (US)

(73) Assignee: The Boeing Company, Chicago, IL (US)

( * ) Notice: Subject to any disclaimer, the term of this patent is extended or adjusted under 35 U.S.C. 154(b) by 320 days.

(21) Appl. No.: 14/882,598

(22) Filed: Oct. 14, 2015

(65) Prior Publication Data
US 2017/0108588 A1    Apr. 20, 2017

(51) Int. Cl.
| H04B 1/707 | (2011.01) |
| G01S 19/30 | (2010.01) |
| H04B 1/7105 | (2011.01) |

(52) U.S. Cl.
CPC ............ *G01S 19/30* (2013.01); *H04B 1/7105* (2013.01); *H04B 2201/709763* (2013.01)

(58) Field of Classification Search
CPC ......... H04L 7/043; H04L 9/06; H04L 9/0606; H04L 9/0656; H04L 9/0662; H04L 9/0668; H04L 9/20; H04L 9/22; H04L 9/24; H04L 9/26; G01S 19/30; H04B 1/7105; H04B 2201/709763

USPC ....... 375/135, 136, 137, 138, 140, 142, 143, 375/145, 146, 147, 148, 149, 150, 152
See application file for complete search history.

(56) References Cited

U.S. PATENT DOCUMENTS

| 2003/0021271 A1* | 1/2003 | Leimer | ................ H04B 7/2618 370/390 |
| 2007/0053324 A1* | 3/2007 | Hwang | .................... G08G 1/08 370/335 |

OTHER PUBLICATIONS

"BeiDou Navigation Satellite System, Signal in Space, Interface Control Document, Open Service Signal B1I (version 1.0)," China Satellite Navigation Office (2012).
"European GNSS (Galileo) Open Service, Signal in Space, Interface Control Document," OS SIS ICD, Issue 1.1 (2010).
"Global Navigation Satellite System (GLONASS), Interface Control Document, Navigational Radiosignal in Band L1, L2, Edition 5.1," Russian Institute of Space Device Engineering (2008).
Global Positioning Systems Directorate Systems Engineering & Integration, Interface Specification IS-GPS-200 (2014).

(Continued)

*Primary Examiner* — Siu Lee
(74) *Attorney, Agent, or Firm* — Walters & Wasylyna LLC

(57) ABSTRACT

Technology to generation of linear feedback shift register based PRN spreading code sequence using a processor device in a computing system is disclosed. A system is provided for generating a GNSS code sequence in a computer system, the system comprising one or more logic circuits configured to at least: receive a plurality of waveform generation parameters; select between a short pseudo-random noise (PRN) cycle and a long PRN cycle according to at least one of the plurality of waveform generation parameters; and emulate a plurality of linear feedback shift registers (LFSR) for generating a block of PRN code chips.

20 Claims, 14 Drawing Sheets

(56) References Cited

OTHER PUBLICATIONS

Global Positioning Systems Directorate Systems Engineering & Integration, Interface Specification IS-GPS-705 (2014).
Global Positioning Systems Directorate Systems Engineering & Integration, Interface Specification IS-GPS-800 (2014).
Lin et al., "Cycle-Efficient LFSR Implementation of World-Based Microarchitecture," *IEEE Transactions on Computers*, vol. 62, No. 4 (2013).
Zeng et Archive al., "High Efficiency Feedback Shift Register: σ-LFSR," *IACR Cryptology ePrint Archive* (2007).
Alaus et al., "A New Reconfigurable Linear Feedback Shift Register Organization to Improve SDR Design," *2009 International Conference on Signals, Circuits and Systems* (2009).

\* cited by examiner

GENERATION OF LINEAR FEEDBACK SHIFT REGISTER BASED PSEUDO RANDOM NOISE (PRN) SPREADING CODE SEQUENCE FOR GLOBAL NAVIGATION SATELLITE SYSTEM

FIELD

The present disclosure relates generally to the generation of pseudo random noise (PRN) spreading code sequence for Global Navigation Satellite System (GNSS) used in a computer system and, in particular, to the dynamic optimization of generation of linear feedback shift register based PRN spreading code sequence using a general purpose processor (GPP) device in a computing system.

BACKGROUND

Satellite-based navigation systems are becoming increasingly important in a wide range of applications, including handheld devices for position determination, in-car navigation support, and so on. The main Global Navigation Satellite Systems (GNSS) in service at present is the global positioning system (GPS) operated by the United States Department of Defense. Numerous other satellite navigation systems like European counterpart satellite navigation system, named Galileo, GLONASS (Russia), Compass (China), IRNSS (India) and QZSS (Japan) are currently under modernization or under deployment.

The basic components of a navigation signal as emitted by a satellite or a pseudolite are a spreading code (also referred to as a positioning, synchronization or ranging code), which is combined with the spreading symbol setting the modulation waveform and the navigation data. The resulting combination is then modulated onto a carrier at a set frequency for transmission to earth. Each emitter generally transmits at multiple frequencies, which can help to compensate for ionospheric effects, to improve accuracy and to broadcast more data. In some cases, multiple signal channels may be modulated onto a single carrier via some appropriate multiplexing scheme.

For example, GPS satellites transmit data along an L1 frequency and an L2 frequency. The L1 frequency is known as the course acquisition (C/A) code. The C/A code is available for civilian use and is a 1.023 MHz PRN code, which repeats its 1023 bits each millisecond. Each satellite transmits a unique PRN code so that GPS receivers can identify each satellite based on the PRN code received from a given satellite.

The spreading sequences used as the C/A codes in GPS belong to a unique family of sequences, referred to as Gold codes that are the sum of two maximum-length sequences. In other words, the C/A code, which are unique for each GPS satellite, are pseudo-random Gold codes comprising a repetition of a 1023 bits, or "chips," with a transition rate of 1.023 MHz, and are often indicated in short as PRN. Moreover, the PRN codes transmitted by the GPS satellites are deterministic sequences with noise like properties. Each C/A code is generated using different initial tapped linear feedback shift register (LFSR) setting. It may therefore be desirable to have a system and method that optimizes signal functions and PRN code generations by reducing hardware components and the processing time, while increasing the speed, flexibility and efficiency of a GNSS system.

SUMMARY

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

A technology is provided for generation of linear feedback shift register based PRN spreading code sequence using a processor device in a computing system is disclosed. In one aspect, a system is provided for generating a Global Navigation Satellite System (GNSS) code sequence in a computer system, the system comprising one or more logic circuits configured to at least: receive a plurality of waveform generation parameters; select between a short PRN cycle and a long PRN cycle according to at least one of the plurality of waveform generation parameters; and emulate a plurality of linear feedback shift registers (LFSR) for generating a block of PRN code chips.

In one aspect, a method is provided for a method of generating a Global Navigation Satellite System (GNSS) code sequence in a computer system, the method may comprise, under the direction of one or more processors and memories, receiving a plurality of waveform generation parameters; selecting between a short PRN cycle and a long PRN cycle according to at least one of the plurality of waveform generation parameters; and emulating a plurality of LFSR for generating a block of PRN code chips.

In an additional aspect, a method is provided for generation of linear feedback shift register based PRN spreading code sequence using a processor device in a computing system is disclosed. A method of providing security in a computer system, the method may comprise, under the direction of one or more processors and memories, receiving a plurality of waveform generation parameters; selecting between a short PRN code sequence cycle and a long PRN code sequence cycle according to at least one of the plurality of waveform generation parameters; and emulating a plurality of LFSR for generating a block of PRN code chips by iteratively generating an output bit for a PRN code sequence using an LFSR table and zero filling a PRN code sequence bit up to a determined chip block size.

The features, functions and advantages discussed herein may be achieved independently in various example implementations or may be combined in yet other example implementations further details of which may be seen with reference to the following description and drawings.

BRIEF DESCRIPTION OF THE DRAWINGS

Figure 1:
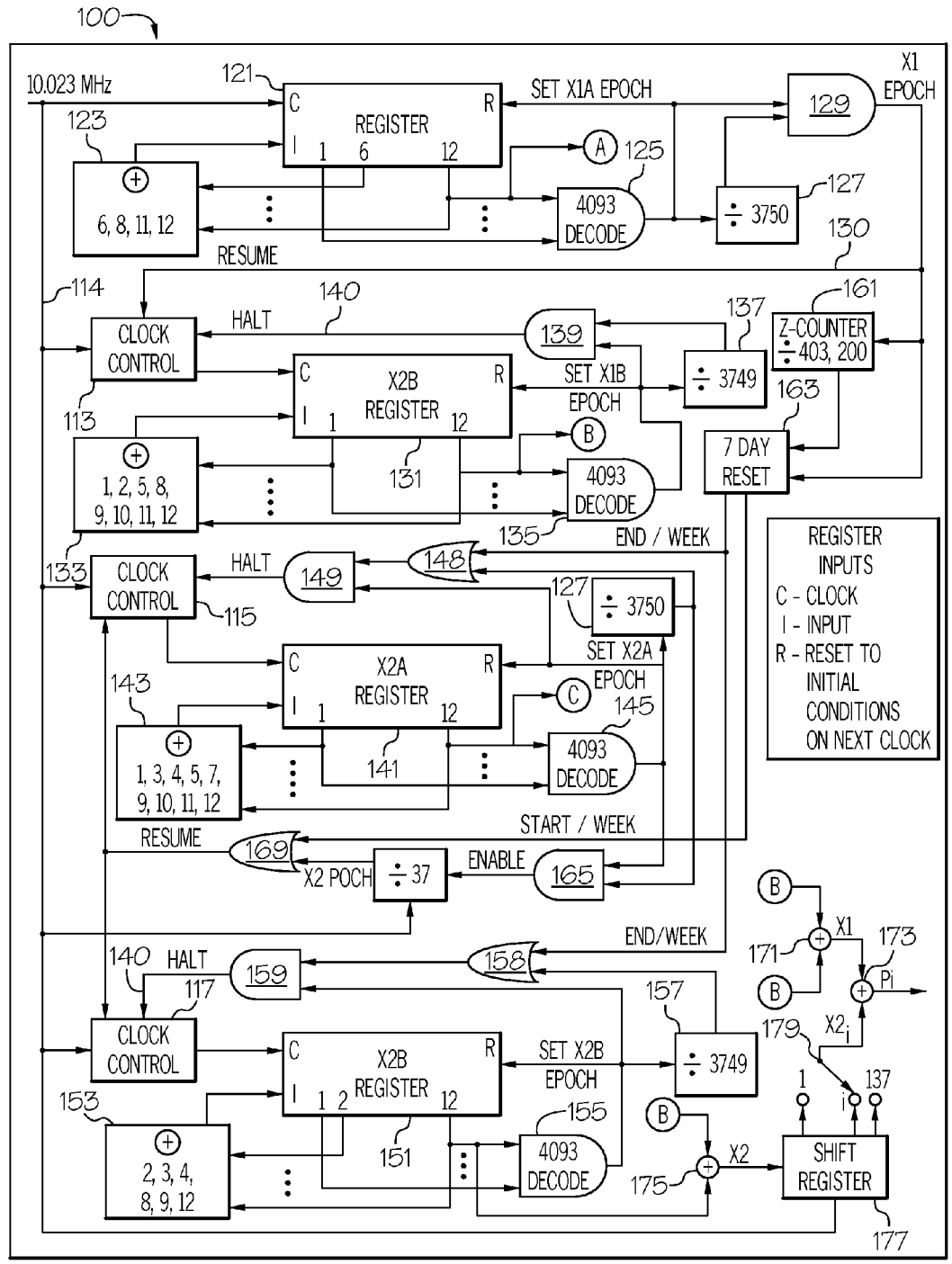

Having thus described example implementations of the disclosure in general terms, reference will now be made to the accompanying drawings, which are not necessarily drawn to scale, and wherein:

FIG. 1 is an illustration of a system using an X1A, X1B, X2A and X2B registers and associated decoders, counters and logic gates to generate the GPS P-code in accordance with example implementations of the present disclosure.

Figure 2:
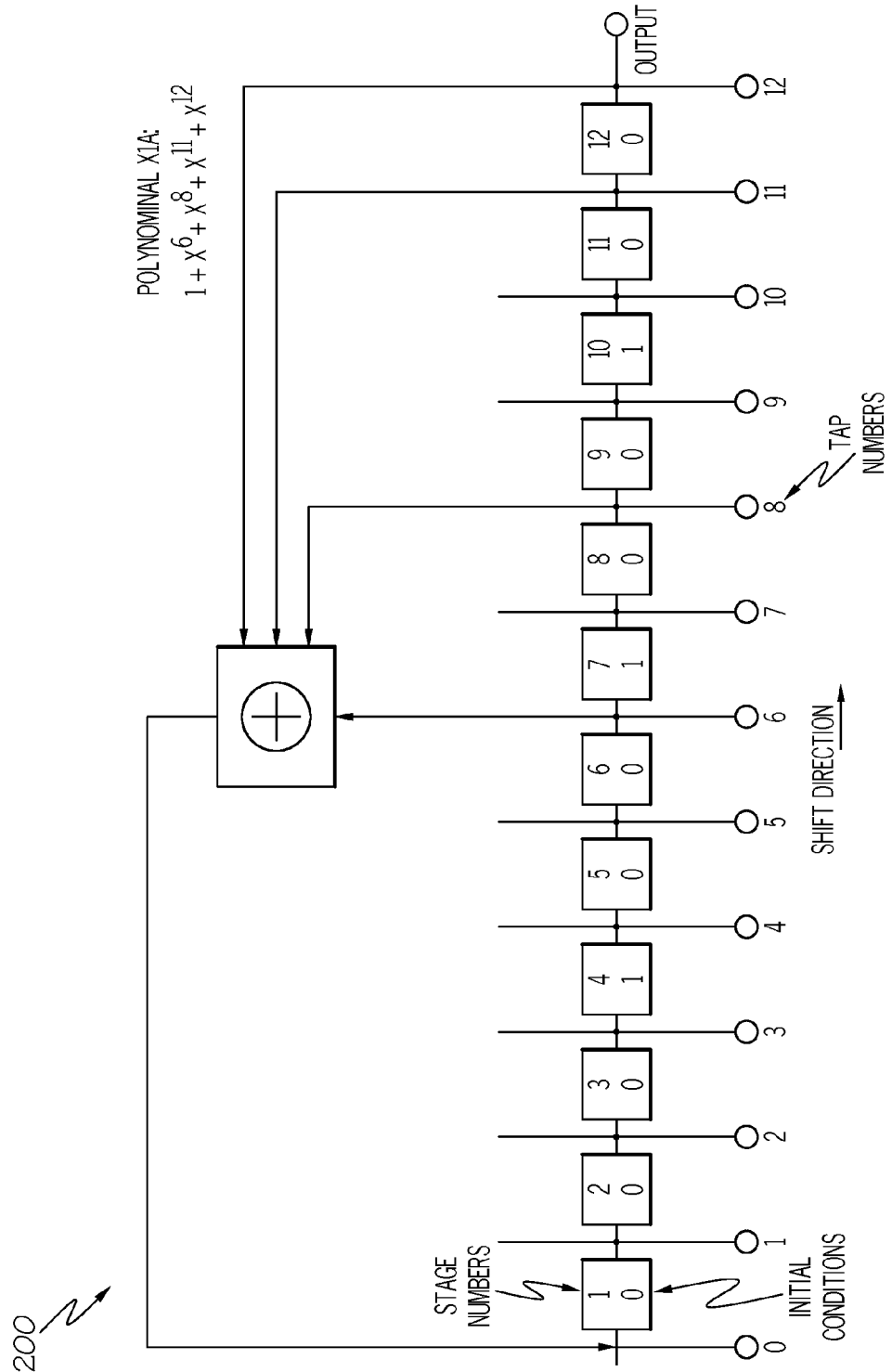

FIG. 2 is an illustration of the X1A shift register generator configuration of the system of FIG. 1.

Figure 3:
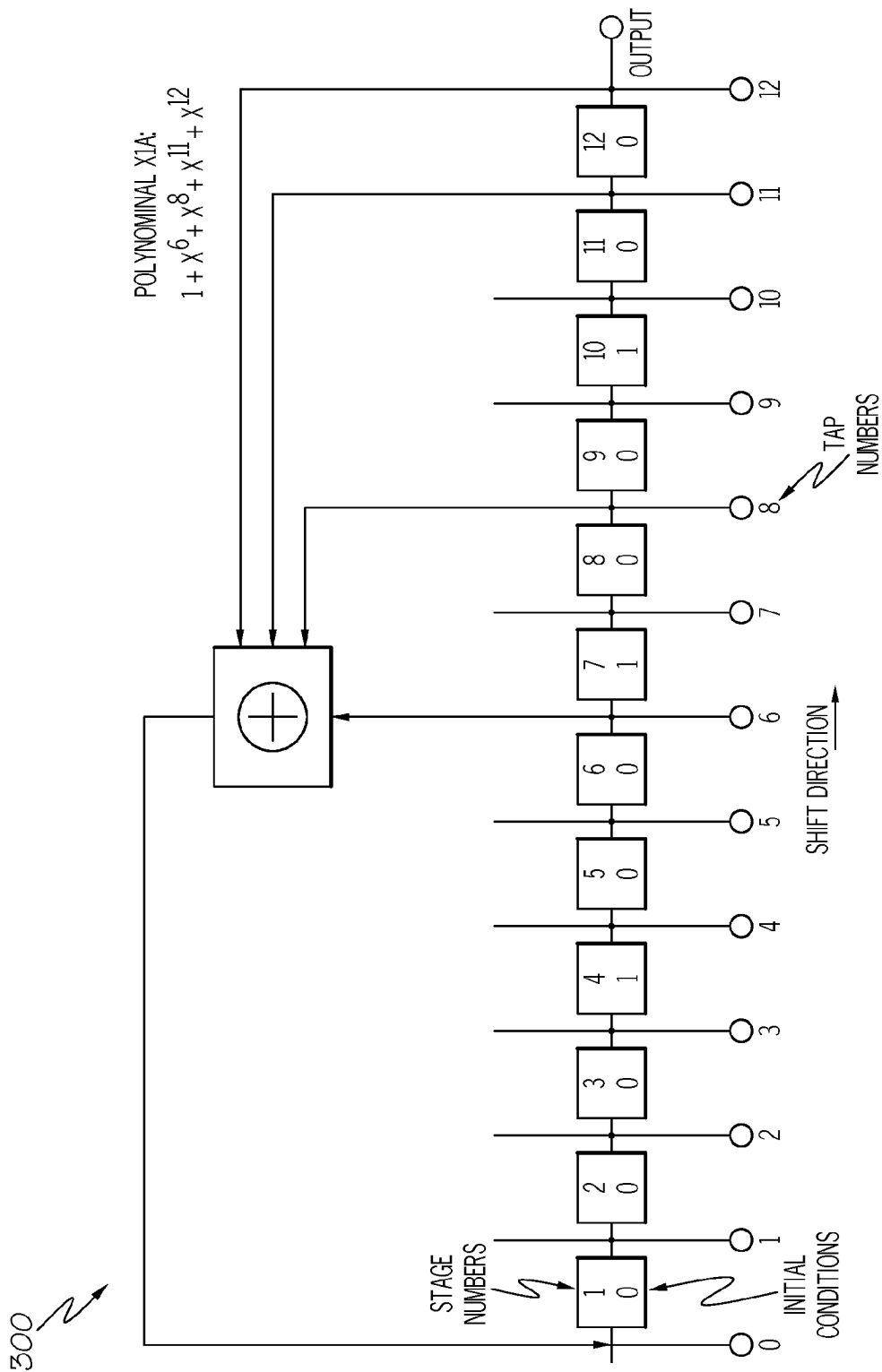

FIG. 3 is an illustration of the X1B shift register generator configuration of the system of FIG. 1.

Figure 4:
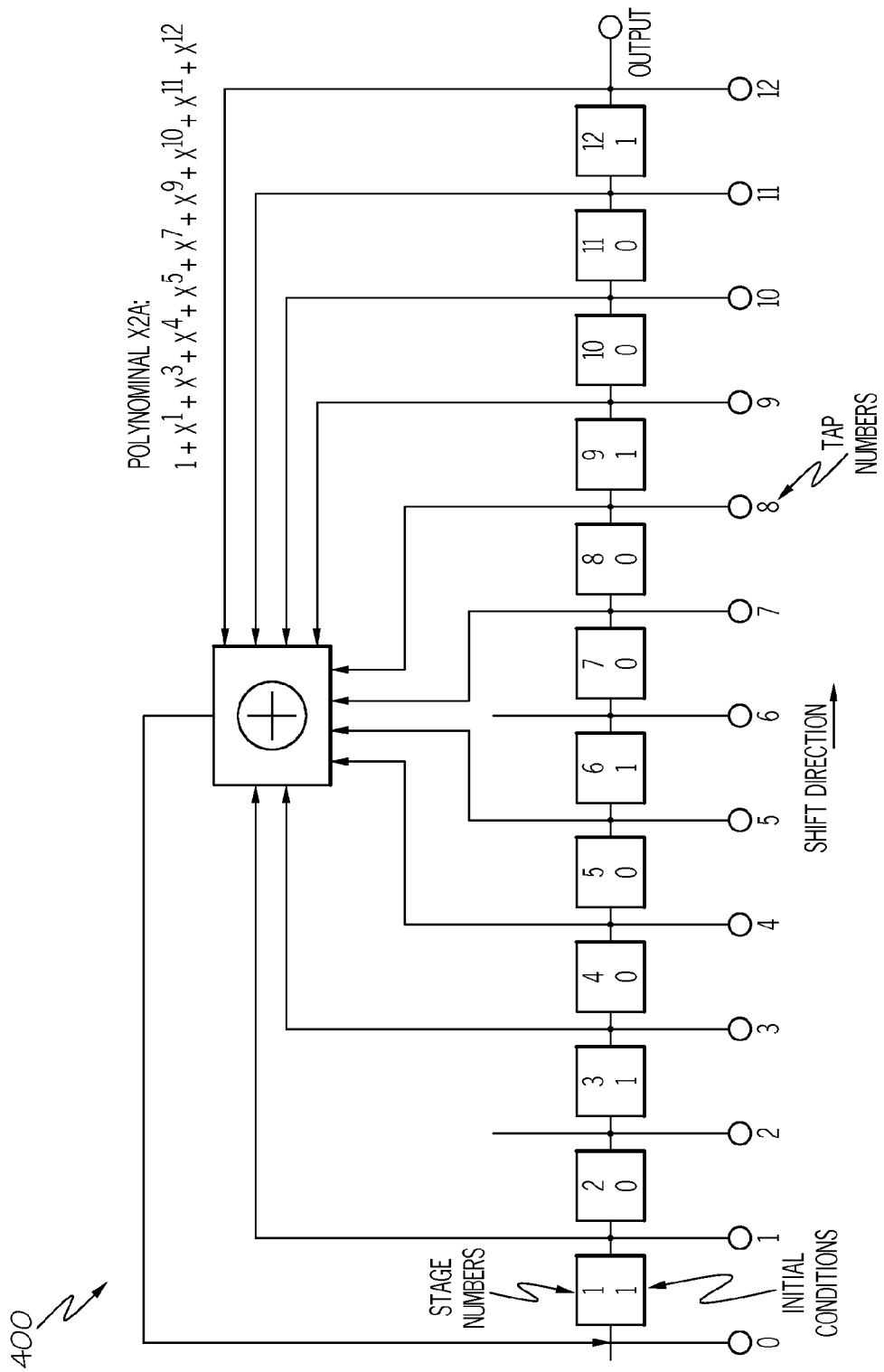

FIG. 4 is an illustration of the X2A shift register generator configuration of the system of FIG. 1.

Figure 5:
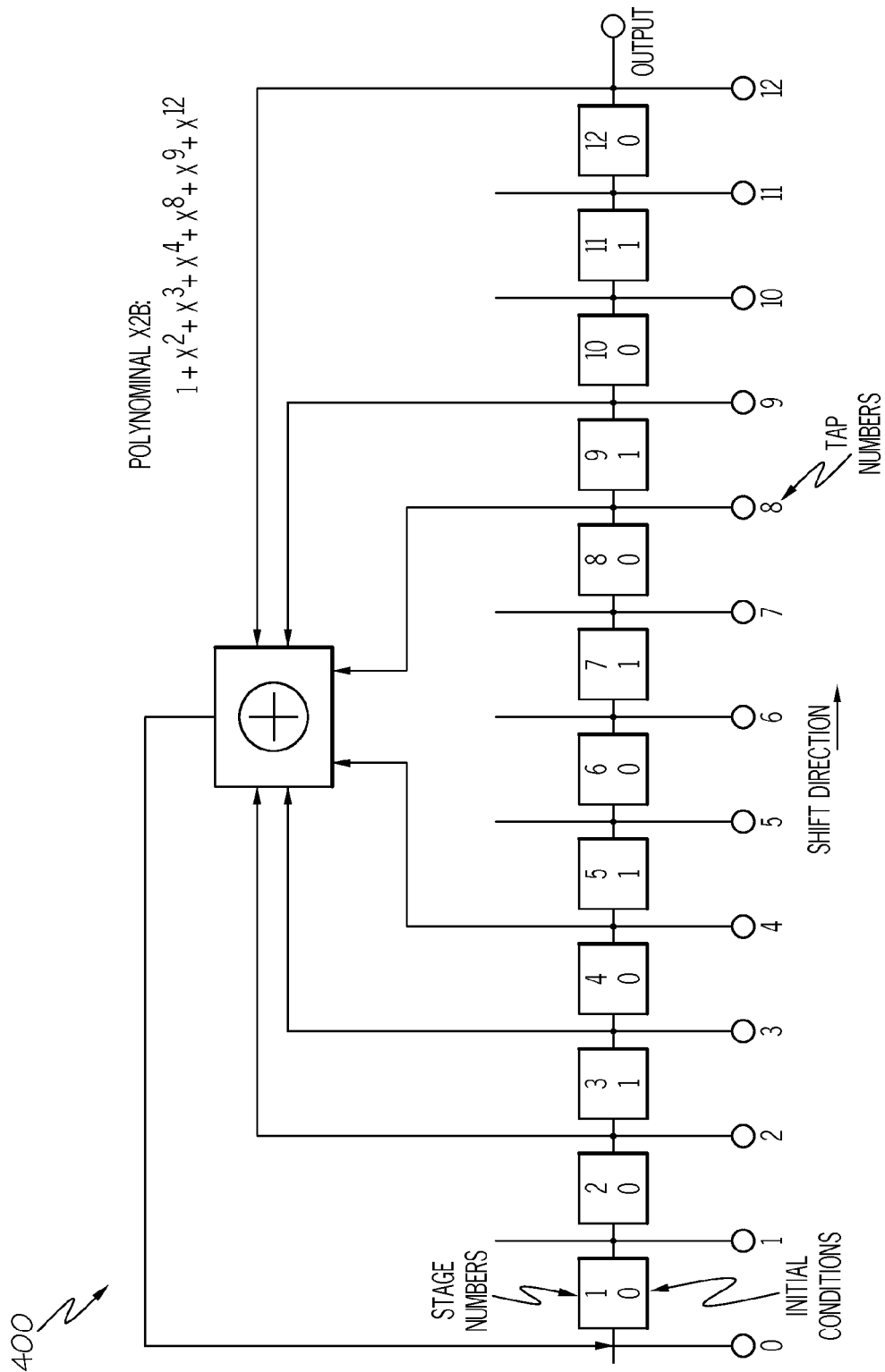

FIG. 5 is an illustration of the X2B shift register generator configuration of the system of FIG. 1.

Figure 6:
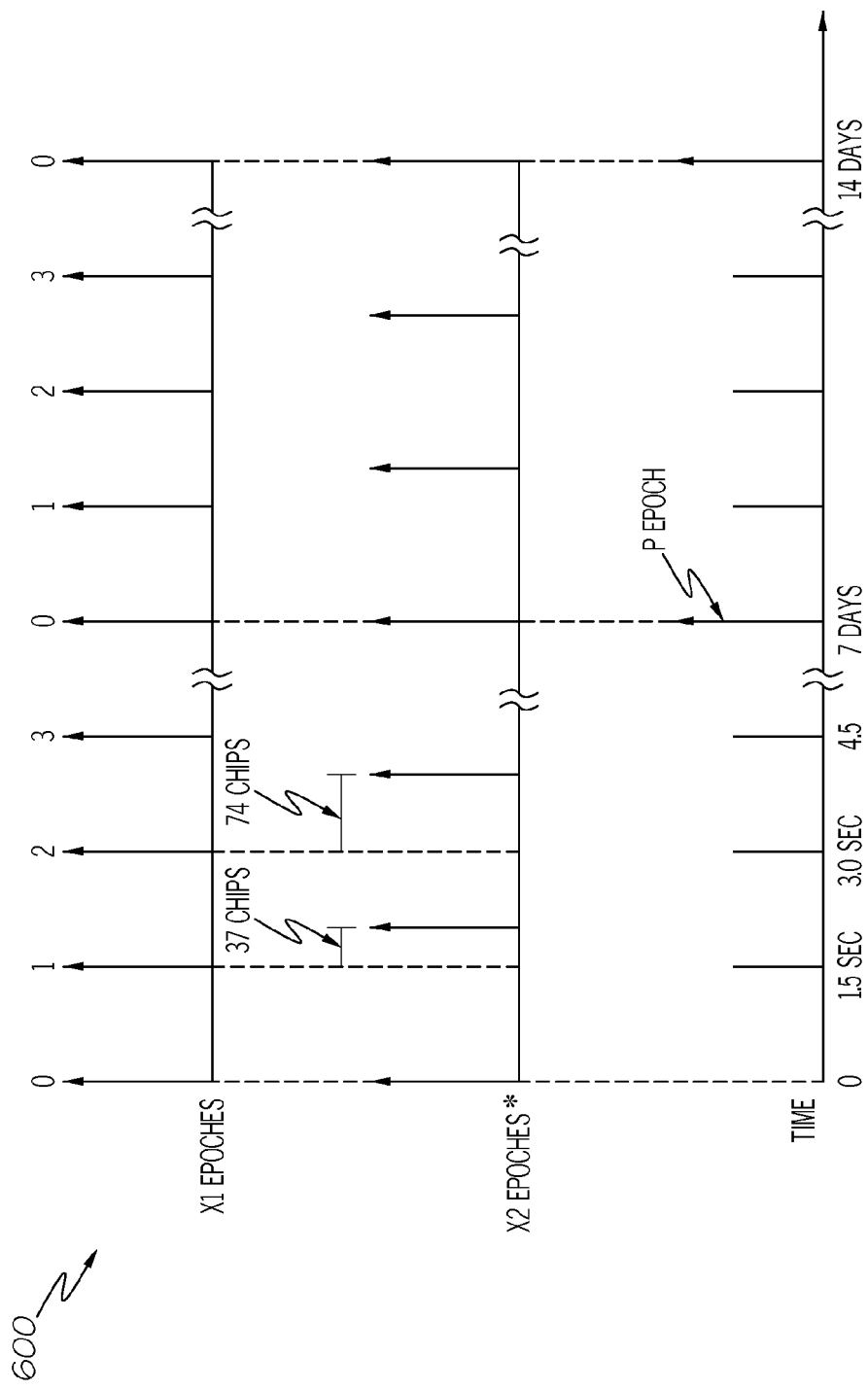

FIG. 6 is an illustration of GPS P-Code signal component timing in accordance with example implementations of the present disclosure.

Figure 7:

FIG. 7 is an illustration of GPS P-Code reset timing in accordance with example implementations of the present disclosure.

Figure 8:
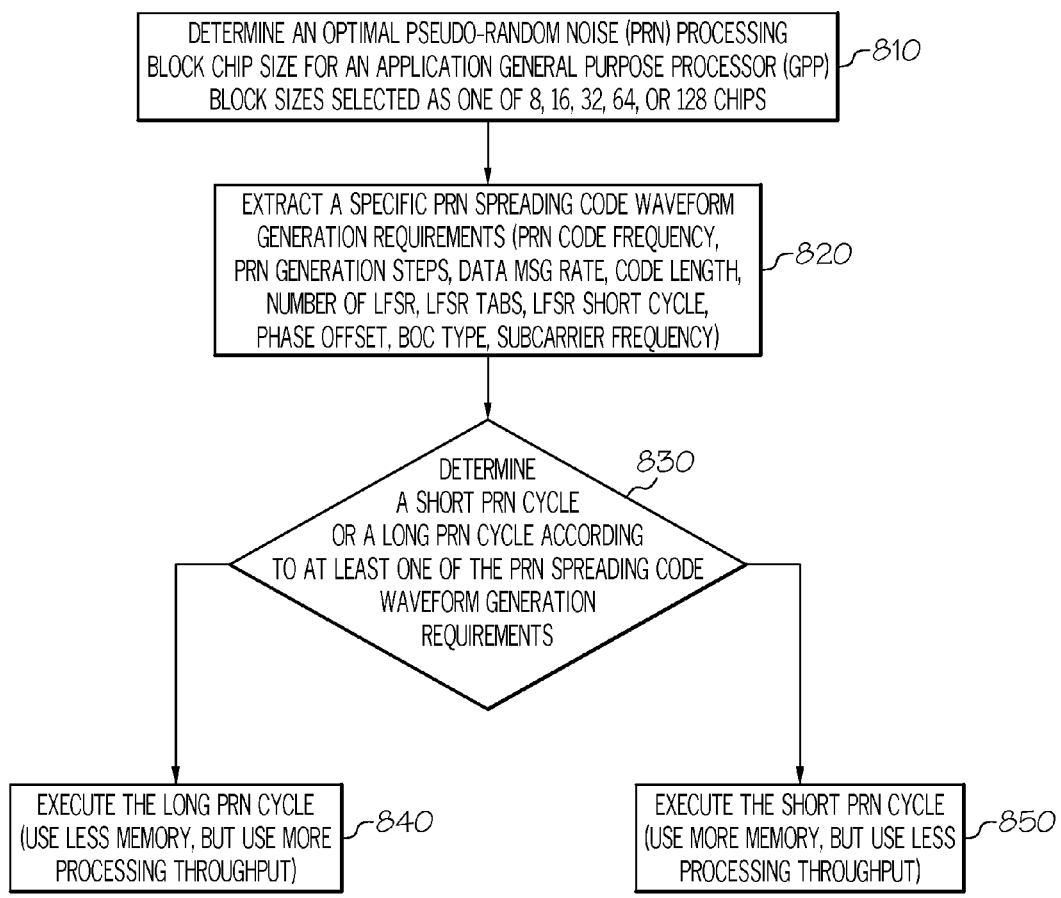

FIG. 8 is a flowchart of an example method for dynamic generation of linear feedback shift register based PRN spreading code sequence using a processor device in according to an example of the present technology.

Figure 9:
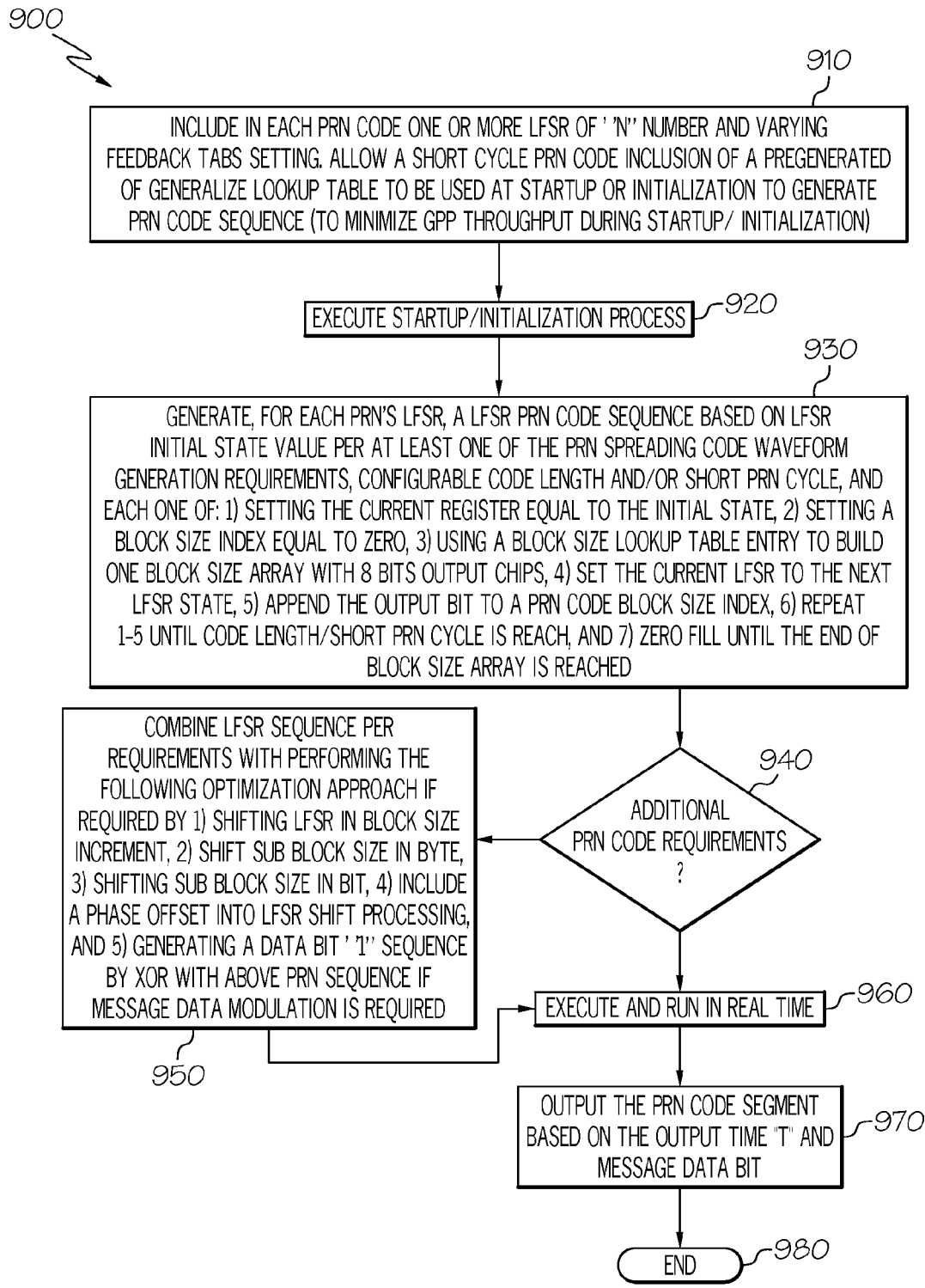

FIG. 9 is a flowchart of an example method for using a short PRN cycle according to waveform generation parameters in according to an example of the present technology.

Figure 10:
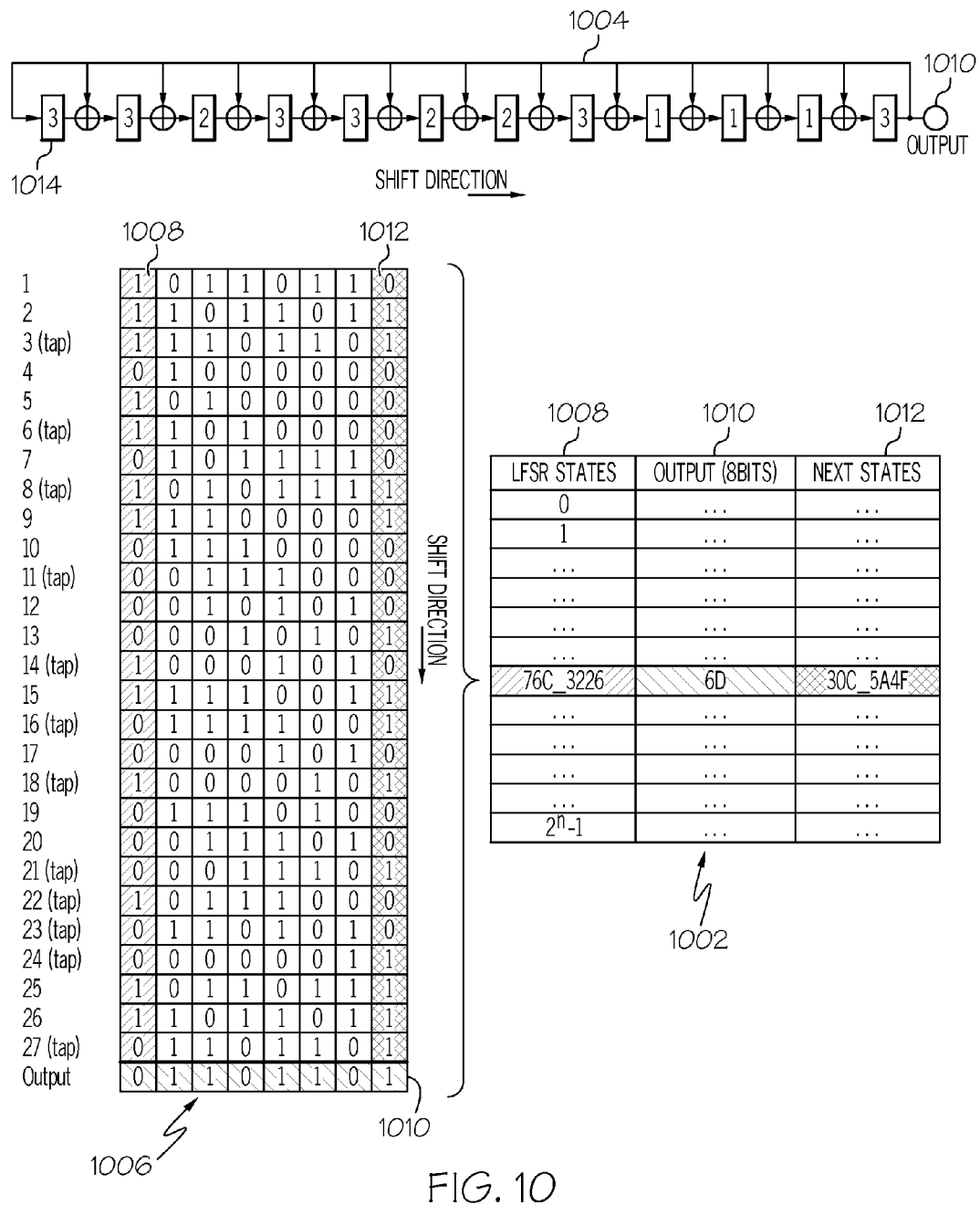

FIG. 10 is an illustration of a Linear Shift Feedback Register (LSFR) lookup table in accordance with example implementations of the present disclosure.

Figure 11:
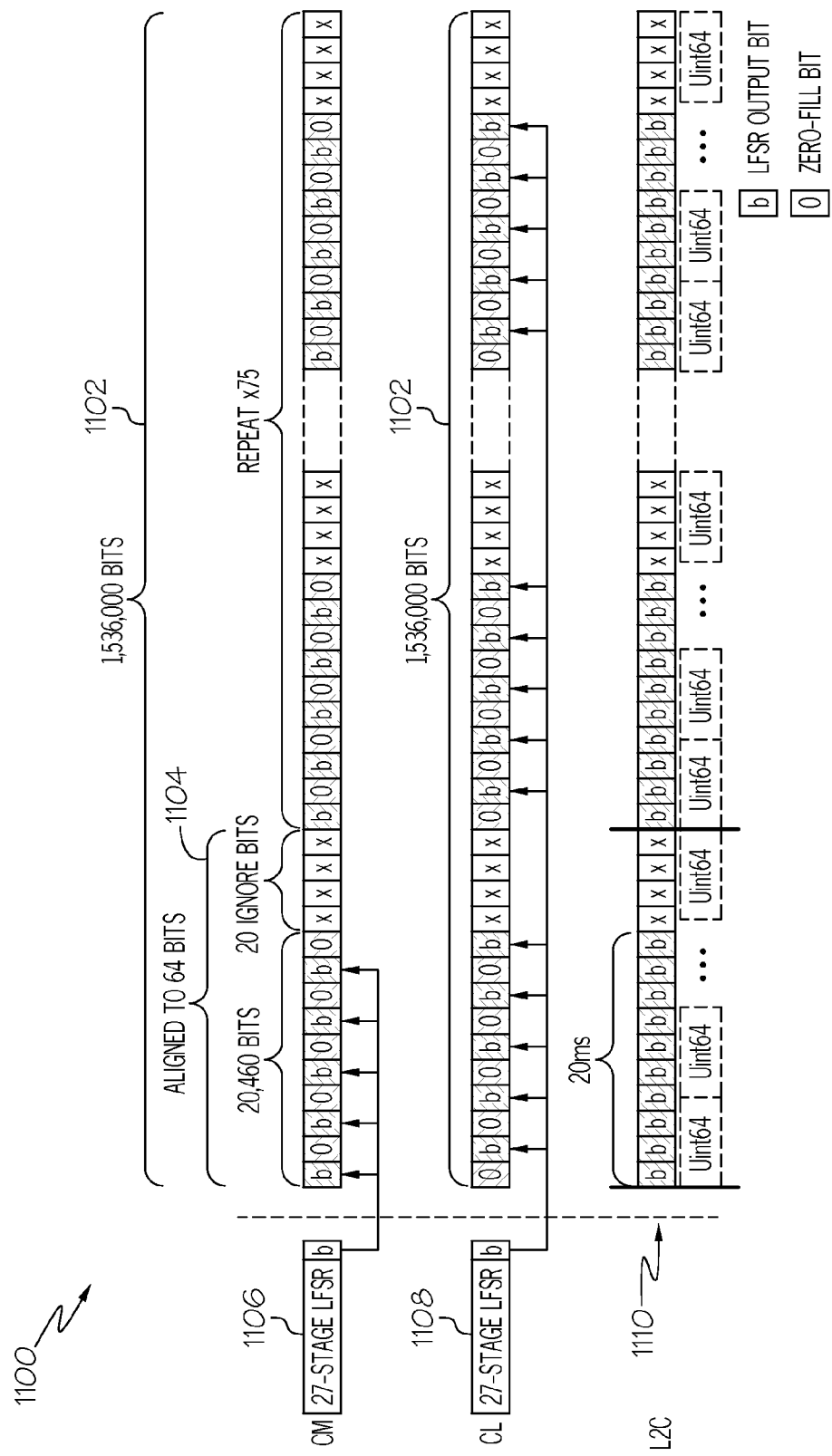

FIG. 11 is an illustration of a GPS L2C PRN code in accordance with example implementations of the present disclosure.

Figure 12:
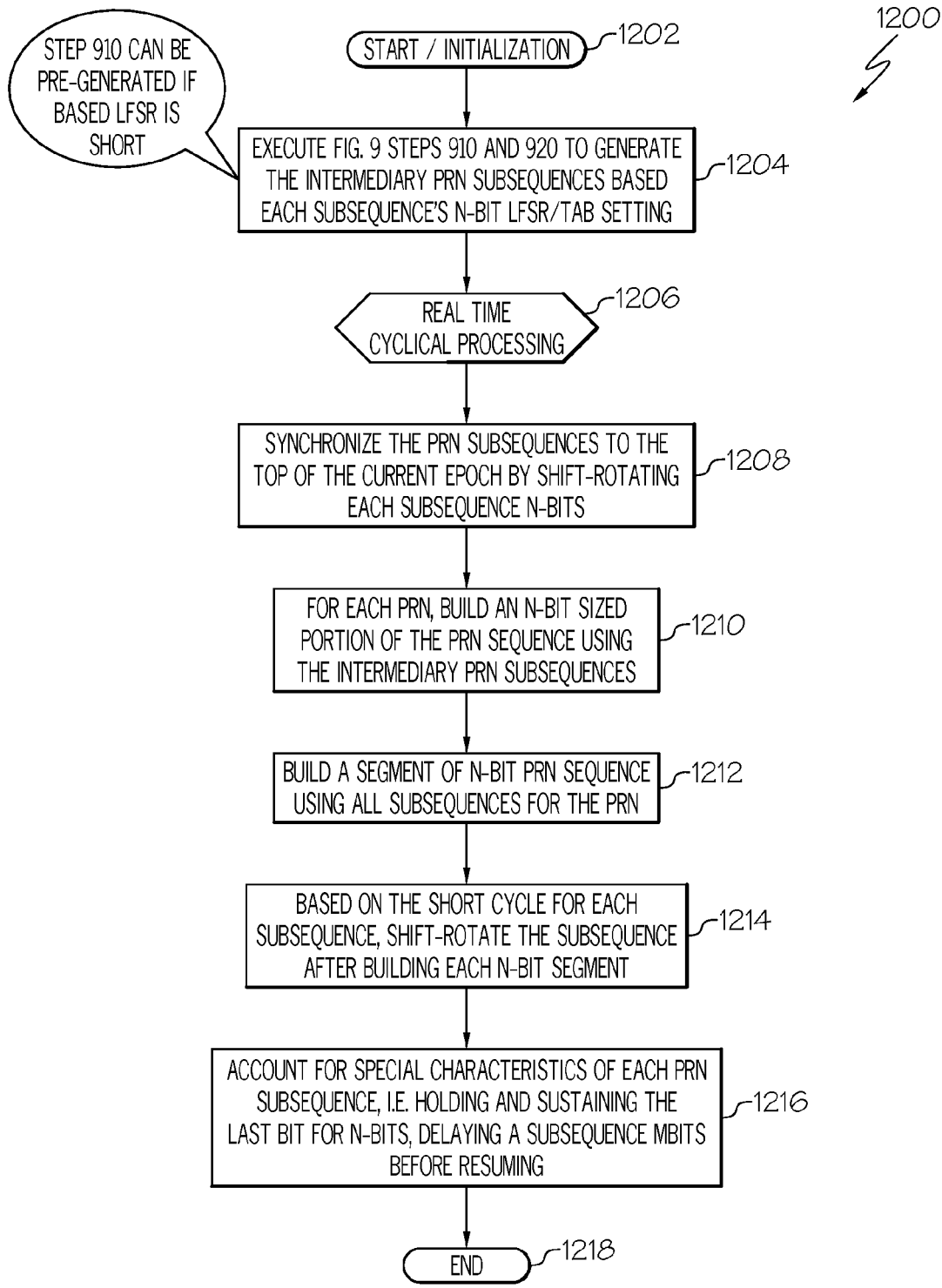
Figure 13:
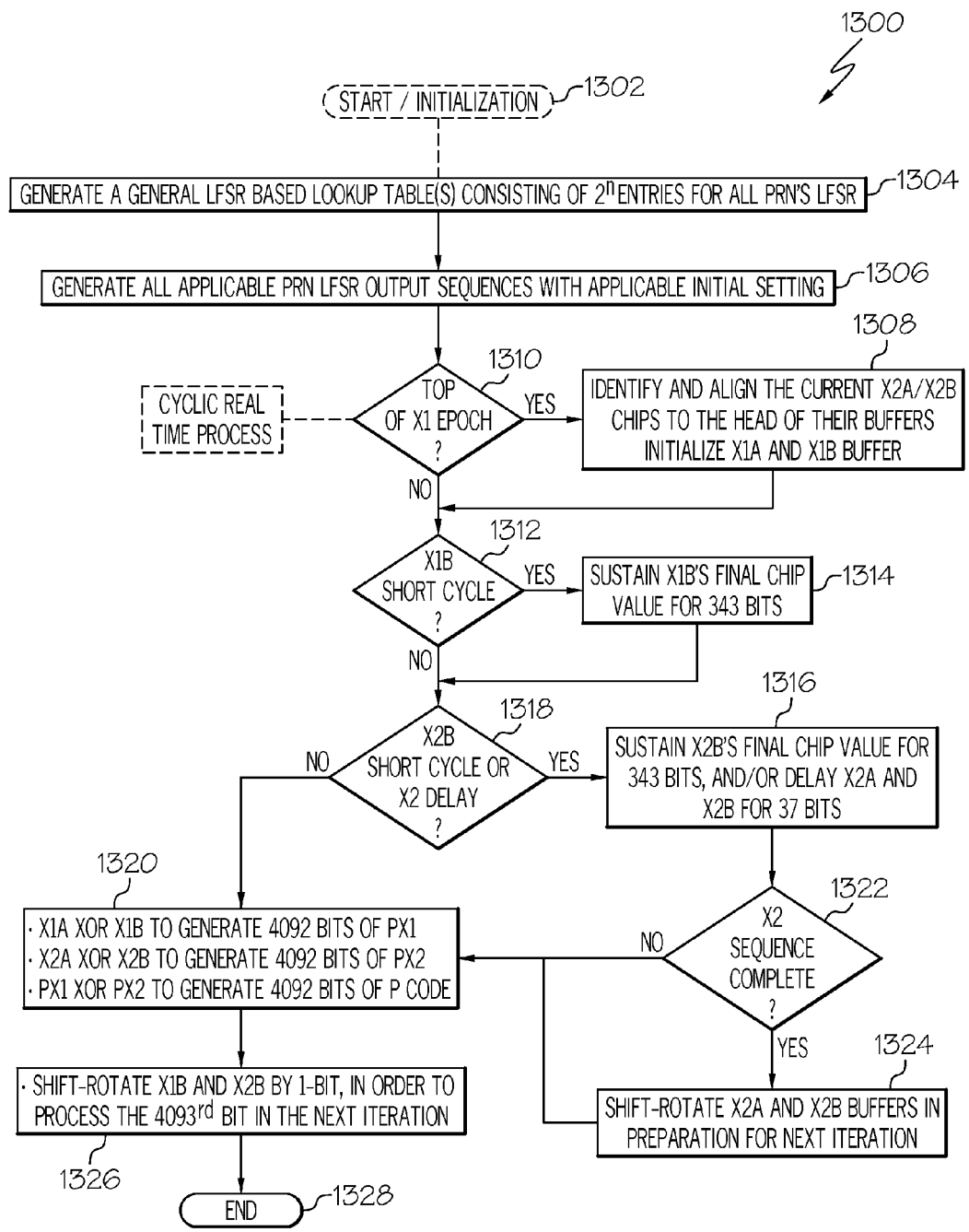

FIGS. 12 and 13 illustrate flowcharts of using long PRN cycle according to waveform generation parameters in accordance with example implementations of the present disclosure.

Figure 14:
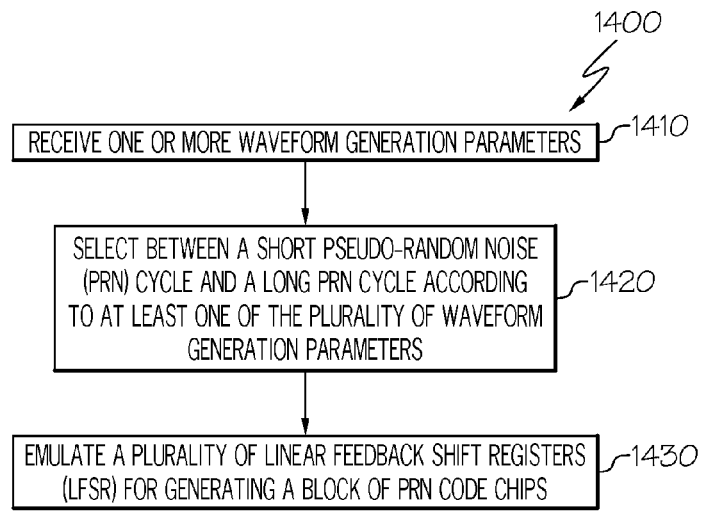

FIG. 14 is an additional flowchart for dynamic generation of linear feedback shift register based PRN spreading code sequence using a processor device in according to an example of the present technology.

Figure 15:
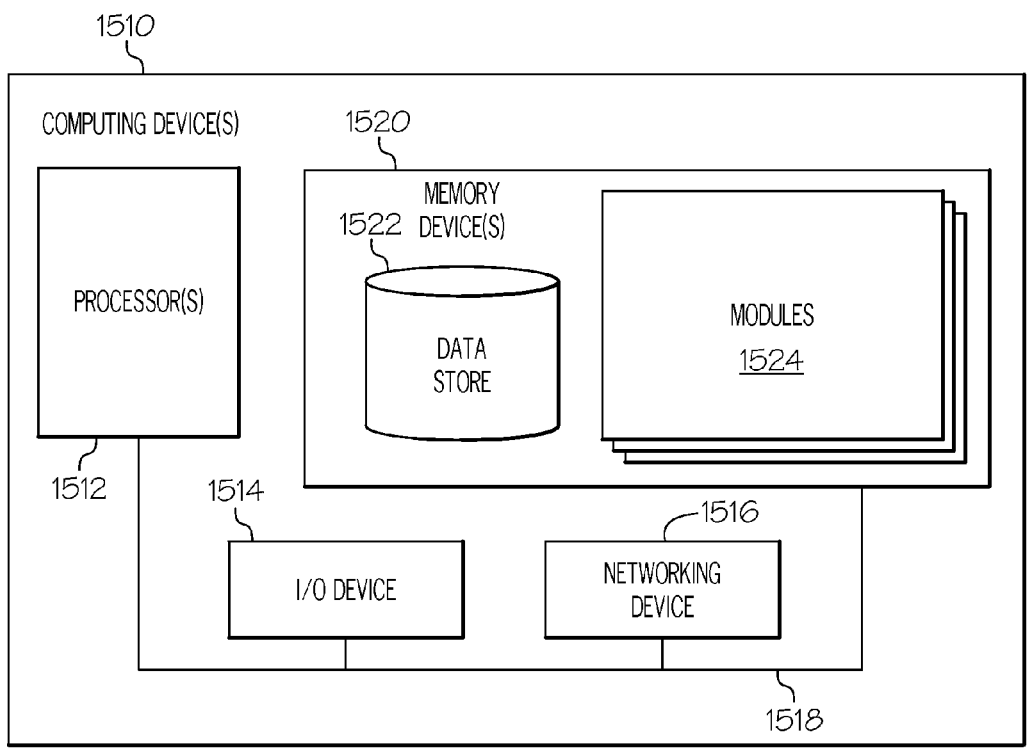

FIG. 15 is an illustration of a computing device on which modules of the disclosed technology may execute.

DETAILED DESCRIPTION

Before the present technology is disclosed and described, it is to be understood that this disclosure is not limited to the particular structures, process operations, actions, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating actions and operations and do not necessarily indicate a particular order or sequence.

Some implementations of the present disclosure will now be described more fully hereinafter with reference to the accompanying drawings, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. For example, unless otherwise indicated, reference something as being a first, second or the like should not be construed to imply a particular order. Also, for example, reference may be made herein to quantitative measures, values, relationships or the like (e.g., planar, coplanar, perpendicular). Unless otherwise stated, any one or more if not all of these may be absolute or approximate to account for acceptable variations that may occur, such as those due to engineering tolerances or the like. Furthermore, it should be understood that unless otherwise specified, the terms "data," "content," "information," and similar terms may be at times used interchangeably. Like reference numerals refer to like elements throughout.

In one aspect, a GNSS satellite, such as a GPS satellite, can transmit three commonly known carrier signal frequencies, centered at 1575.42 MHz (L1 carrier), at 1227.6 MHz (L2 carrier), and at 1176.4 MHz (L5 carrier). All three L1, L2 and L5 carrier signal frequencies carry binary phase shift keying ("BPSK") modulation. The L1 carrier signal is modulated by the L1 Civil data code, L1 Civil pilot code, L1 Modernized Military code (M-Code), P code and C/A code. The L2 carrier signal is modulated by the L2 Civil Moderate code, L2 Civil Long code, L2 Modernized Military code, and P code only. The L5 carrier signal is modulated by the L5 InPhase and Quadraphase code. The C/A code is clocked at 1.023 MHz and its sequence repeats every 1023 chips, giving the C/A code a period of 1 millisecond (ms). The P code is clocked at 10.23 MHz and has a code period of precisely 1 week (7.000 days). With the exception of non-repeating Modernized Military code, all other code periods are in between C/A and P codes. By associating different code initialization sequences to a particular satellite's PRN number, the user can determine a particular satellite signal by searching through the codes associated with that satellite vehicle's PRN.

A code-correlating receiver generates a replica of the code transmitted by the satellite. This is used to strip off the BPSK modulation and the original carrier signal leaving navigation data message. The phase of the local PRN code signal allows a measurement of the satellite Pseudo Range, which is defined as the measured range to a satellite, uncorrected for synchronization errors between the receiver and satellite clocks. The C/A code receivers use the L1 signal only, but receivers that are capable of P code operation can use both the L1 and the L2 signals. This allows the P code receivers to measure and apply a dual frequency correction to delays induced by the ionosphere.

Moreover, in a GNSS system, a PRN code sequence can use chained LFSR as the bases for code sequence generation. Each PRN's chain of LFSR can include a specified number of shift registers (SR) stages, SR feedback stages, SR stages' initialization values, and LFSR short cycle length. For example, a GNSS system can use one or two LFSR based PRN codes that are short code sequences (e.g., 511 bits to 2 kilobytes "Kb") and durations, such as 1 ms. Alternatively, other GNSS systems may use longer PRN spreading codes, such as a GPS P code or Galileo's E5 primary code, that involve at least 4 LFSR having varying short cycles and LFSR modulation with respect to each in a definition of code sequences.

In one aspect, PRN code generators, for a transmitter and receiver applications, can transition from hardware (e.g., an application specific integrated circuit "ASIC") to firmware (e.g., field programmable gate arrays "FPGA") for initialization and configuration implementation that can also include pre-generated short PRN code sequences stored in memory and a reprogrammable processor implementation for minimizing costs and hardware rework capable of supporting future waveform requirement updates. The hardware approach, such as the ASIC, provides low power but lacks flexibility to accommodate future waveform requirement updates. The firmware approach (e.g., FPGA) is reprogrammable but has an increase in cost of power consumption.

As such, a technology is provided for optimizing implementation of the LFSR in a GPP thereby eliminating more costly processors while eliminating storage of pre-generated code sequences that reduce system memory requirements.

In one aspect, a technology provides for dynamic generation of linear feedback shift register based PRN spreading code sequence using a GPP device in a computing system is disclosed. In one aspect, the technology optimizes the generating a GNSS code sequence using a GPP in a computer system, the system comprising one or more logic circuits configured to at least: receive one or more waveform generation parameters; select between a short PRN cycle and a long PRN cycle according to at least one of the one or more waveform generation parameters; and emulate one or more LFSR for generating a block of PRN code chips.

In one aspect, a PRN code generator is implemented in the GPP for one or more LFSR having any number of SR stages, polynomial representations, initiation values, and/or short or long code lengths. Moreover, the PRN code generation can be based on a spreading code sequences requirement specified as a bit-by-bit generation algorithm. In one aspect, the PRN code generator, using the GPP, is optimized by performing a task on a byte, a word, and/or a long word boundary byte aligned processing (e.g., a block size falls on the byte boundary). In one aspect, the PRN code generator using the GPP is optimized by supporting real-time and/or non-real time generation of PRN spreading code sequences using the GPP while eliminating the ASIC and/or firmware. Also, the PRN code generator using the GPP is optimized by generating a block of PRN code chips in one execution (or pass) of the LFSR. A block-size table lookup of the LFSR can be used to reduce the repetitive chip-by-chip table lookup operation. Optimization is also achieved by outputting one or more bit sequences that may also correspond to one or more PRN code chips. As such, the lower power of the configurable hardware (e.g., an ASIC) can be used for backend digital waveform processing of the output waveform. These ASIC's functions include frequency up conversion, signals bypass filtering, and signal combining . . . .

Turning now to FIG. 1, PRN code sequences using chained LFSR as the bases for code sequence generation, are depicted. More specifically, FIG. 1 is an illustration of a system 100 using an X1A, X1B, X2A and X2B registers and associated decoders, counters and logic gates to generate the GPS P-code in accordance with example implementations of the present disclosure.

The system 100 can be driven by receipt, on a clock signal line, of a sequence of clock pulse signals produced by a 10.23 MHz clock pulse source that are also synchronized to the C/A code signal. A 12-bit X1A register 121, with associated feed-through polynomial module 123, receives the clock pulse sequence directly and generates a 12-bit register state with a chosen bit position that has an associated 4096 unique code sequence X1A(t) for each of a sequence of times t=mT (m=0, 1, 2, . . . , M). The X1A code cycles through the first 4092 chips in a single X1A (0.0004 second) period. The X1 period has length $\Delta t=1.5$ sec=(15,345,000 chips)/(10.23 MHz). Each state is monitored by an X1A cycle decoder 125 that issues an X1A epoch short cycle signal each time the chip number reaches 4092 (or 400 microseconds). The X1A epoch short cycle signal resets the X1A PRN signal to its initial value. This output signal from the decoder 125 is received by a divide-by-3750 X1A counter 127 that issues a predetermined divider output signal when the X1A epoch count reaches 3750. The output signal from the X1A counter 127 is received by one of two input terminals of an AND gate 129. The other input terminal of the AND gate 129 receives the output signal from the decoder 125. When the two input signals for the AND gate 129 are both high, which occurs only at the end of each X1 period, the output signal of the AND gate 129 goes high and an X1 epoch output signal is issued. The X1 epoch signal issued by the AND gate 129 is received by a first input terminal (the "resume counting" terminal) of a clock control module 113 that receives and passes clock pulses to a register 131. The clock control module 113 is enabled by receipt of a high signal at its "resume counting" input terminal, which allows a sequence of clock pulses received at a clock input terminal to be passed through as an output signal, if the clock control module 113 is presently disabled. The clock control module 113 is disabled by receipt of a high signal at its "halt counting" input terminal. Receipt of the "halt counting" signal terminates pass-through of the clock pulse sequence received by the clock control module 113 until the next "resume counting" signal is received.

A 12-bit X1B register 131 and associated feed-through polynomial module 133 generates a 12-bit register state with a chosen bit position that has an associated code sequence X1B(t) for each of a sequence of times t=mT (m=0, 1, 2, . . . , M). As each new X1B code sequence is generated, the sequence is monitored by an X1B cycle decoder 135 that operates analogously to the X1A cycle decoder 25, except that the X1B cycle decoder 35 issues an X1B epoch output signal after 4093 chips. The X1B epoch output signal from the X1B cycle decoder 135 is received by a divide-by-3749 X1B epoch counter 137 that operates in a manner similar to the divide-by-3750 counter 127. The output signals from the X1B cycle decoder 135 and from the divide-by-3749 X1B epoch counter 137 are received by two input terminals of an AND gate 39 that issues a high output signal, once every (4093)×(3749)=15,344,657 chips. This high output signal from the AND gate 139 is received by a second input terminal (the "halt counting" terminal) of the clock control module 113 and disables this clock control module so that no further clock signal is received by the X1B register 131.

Receipt of a high input signal at the "halt counting" terminal of the clock control module 113 causes this module to suppress pass-through of the clock pulse sequence output that would otherwise be issued at its output terminal, as discussed above. Receipt of the "halt counting" signal by the clock control module 113 freezes the code output signal received from the X1B register by the decoder 135 at the value X1B(t=[15,345,000−343]T) until the time t=15,345,000 T, at which point the X1A and X1B code sequence developments continue without re-initialization. Re-enablement of the clock control module 113 occurs when this clock control module receives a "resume counting" signal from the AND gate 129 at a second input terminal of the clock control module 113, and this occurs at the end of each X1 period, as described above ($\Delta t=1.5$ sec).

The X2A register 141 and the X2B register 151 behave analogously to the X1A register 21 and the X1B register 131, respectively. The X2A register 141 is a 12-bit register with associated feed-through polynomial module 43 that together generate a 12-bit register state with a chosen bit position that has an associated code sequence X2A(t). As the code sequence X2A(t) is generated, the X2A register 141 cycles through 4092 chips a total of 3750 times in an X2 period of length $\Delta t=1.5$ sec. The output state from the X2A register 141 is passed through a 4092-chip decoder 45, which produces an X2A epoch output signal, and then through a divide-by-3750 counter 147. The output signal from the counter 147 is received by one of two input terminals of an OR gate 148, whose second input terminal receives an EOW signal indicating when the end of a week or other designated overall period has occurred. If either of these two input signals for the OR gate 148 is high, the OR gate output signal will be high. The output signal from the OR gate 148 is received by one of two input terminals of an AND gate 149, whose second input terminal receives the output signal from the X2A epoch decoder module 145. The output signal from the AND gate 149 is high only when: (1) the end of a 4092-chip cycle is reached; and (2a) the end of an X2A period is reached ($\Delta t=1.5$ sec) or (2b) an end-ofweek signal EOW is received. Receipt of a high output signal from the AND gate 149 at a "halt counting" terminal of a second clock control module 15 commands this module to halt its clock pulse pass-through operation, until a "resume counting" signal is received on a control line 116 at a "resume counting" terminal of the module 115. The "resume counting" signal commands resumption of pass through by the clock control module 115 of clock pulses received from the clock pulse source 112.

In a similar manner, an X2B register 151, an associated feed-through polynomial module 153, a 4093-state decoder 155, a divide-by-3749 X2B epoch counter 157, a two-input terminal OR gate 158 and a two-input terminal AND gate 159 generate the 3749×4093=15,344,657 chips of the X2B code. The OR gate 158 receives the EOW signal and an output signal from the X2B epoch counter 157 at its two input terminals. The AND gate 159 receives the output signal from the 4093-chip decoder 155 and the output signal from the OR gate 158 at its two input terminals. The output signal from the AND gate 159 is received by a "halt counting" input terminal of a third clock control module 17 and halts the clock pulse pass-through operations of the clock control module 17 when: (1) the end of a 4093-chip period is reached in the X2B register 151; and either (2a) the end of an X2B period is reached or (2b) an EOW signal is received. The clock control module 17 resumes its clock pulse pass-through operations when this module receives a "resume counting" signal on control line 116.

A divide-by-403,200 counter 161, referred to as an seven-day or Z counter, receives the X1 epoch signals from the AND gate 129 and issues a high output signal (EOW) after receipt of 403,199 consecutive X1 epoch signals, indicating the start of the last X1 period of the current week. The end of the week occurs one X1 period later, after the counter 61 has received 403,200 consecutive X1 epoch signals. The X1 epoch signals are spaced $\Delta t=1.5$ sec apart so that the total time interval is 604,800 sec=7.000 days in the configuration shown here. This total time interval may be any convenient interval of reasonable length. The output signals from the seven-day counter 61 and from the AND gate 129 are received by a seven-day reset module 163, which issues an end of week signal EOW as an output signal on a first output signal line 164 when the last X1 period of the current week has begun and issues a start-of-week signal SOW on a second output signal line 166 when a new week begins. The EOW signal is received by the OR gates 148 and 158, as noted above.

The SOW signal is received by one of two input terminals of an OR gate 169 on the signal line 166 from the seven-day reset module 163. An AND gate 165 receives the output signals from the 4092-chip decoder 145 and from the X2A epoch divider module 147 and periodically issues an X2 epoch output signal, indicating that the end of an X2 period has been reached. The output signal from the AND gate 165 enables a divide-by-37 counter 167 that, in its enabled state, receives and counts clock pulse input signals from a clock pulse source that drives the system 100. After count 37 is reached by the enabled counter 167, this counter issues a high output signal that is received by a second input terminal of the OR gate 69. The OR gate 69 thus issues a high output signal whenever (1) the gate receives an SOW signal or (2) the gate receives a high signal from the divide-by-37 counter 167, 37 chips beyond the end of the current X2 period. The output signal from the OR gate 169 is received by the control line 116, which delivers a "resume counting" signal to each of the clock control modules 115 and 117 and causes these clock control modules to resume pass-through operations of the clock pulses received on the signal line 114 from a clock pulse source. The result of a temporary halt, for 37 chips, in clock pulse pass-through operations for the X2A and X2B registers is that the X1A and X1B registers precess by 37 chips relative to the X2A and X2B registers at the end of each X1 period ($\Delta t=1.5$ sec).

The code sequences X1A(t) and X1B(t) issued by the registers 121 and 131 are received at two input terminals of an EX-OR gate 171, whose output signal X1A(t) $\oplus$ X1B(t)= X1(t) is received by one of two input terminals of an EX-OR gate 173. The code sequences X2A(t) and X2B(t) issued by the registers 141 and 151 are received at two input terminals of a third EX-OR gate 175. The output signal X2A(t) $\oplus$ X2B(t)=X2(t) from the EX-OR gate 175 is received by a 37-place shift register 177 that has 37 output terminals, one such output terminal corresponding to each of the time delays $\Delta t_d$=nT (n=1, 2, . . . , 37). An operator-controllable 6-bit latch and multiplexer 79 determines which of the 37 time delays $\Delta t_d$=nT is used to form the time sequence X2(t-$\Delta t_d$) that issues as an output signal from the latch/multiplexer 179. This output signal is received by a second input terminal of the EX-OR gate 173, which issues the desired output signal X1(t) $\oplus$ X2(t-$\Delta t_d$) that is the characteristic code for one satellite vehicle.

The system 100 shown in FIG. 1 can be modified but is representative of the complexity of the conventional approach to P code generation. The arrangement of a large number of registers, decoders, counters and logic gates seriatim builds in a considerable time delay, because of the accumulated gate delays and other device delays of such arrangements. Further, use of so many components reduces the reliability of the apparatus and the mean-time-to-failure. In addition, evolving requirement such as a GPS III requirement, to support 63 PRN number rather than 37 PRN making the current hardware implementation obsolete. What is needed is simpler apparatus that produces the same P code with fewer serial components and with increased reliability and flexibility.

For simplicity, following discussion is applicable to only pre GPS III P code. In one respect, while not discussed here, the innovation allows for easy adoption of updated GPS III requirement. As illustrated in FIG. 1, the P code circuit consists of two codes, called the X1 code and the X2 code. The satellite PRN selection is performed by delaying the X2 code relative to the X1 code by one or more chips. Delays of 1 to 37 chips are defined, which allows generation of code sequences 1 through 37. The X1 code consists of 15,345,000 chips which, when clocked at 10.23 MHz, has a repetition period of precisely $\Delta t=1.5$ seconds. The boundary between the last X1 code chip and the first X1 code chip of the following cycle is called an X1 epoch. The X2 code sequence consists of 15,345,037 chips, making it 37 chips longer than the X1 code sequence. This allows the X1 code to precess relative to the X2 code by 37 chips every 1.5 seconds.

Each of the X1 and X2 codes is produced by an Exclusive OR ("XOR") operation applied to two shorter length code sequences. The X1 code results from XORing X1A code and X1B code. The X2 is made from XORing an X2A code and an X2B code. The X1A, X1B, X2A and X2B codes are short cycled, maximal length PRN sequences that are generated using four 12-bit shift registers. That is, each P code is the modulo-2 sum of two extended patterns clocked at 10.23 Mbps (X1 and X2i). X1 itself is generated by the modulo-2 sum of the output of two 12-stage registers (X1A and X1B) short cycled to 4092 and 4093 chips respectively. When the X1A short cycles are counted to 3750, the X1 epoch is generated. The X1 epoch occurs every 1.5 seconds after 15,345,000 chips of the X1 pattern have been generated. The polynomials for X1A and X1B, as referenced to the shift register input, are:

$X1A: 1+x^6+x^8+x^{11}+x^{12}$, and $X1B: 1+x^1+x^2+x^5+x^8+x^9+x^{10}+x^{11}+x^{12}$.

As illustrated in FIGS. 2-5, various relationship between shift register taps and the exponents of the corresponding polynomial, referenced to the shift register input, are depicted for the X1A shift register configuration 200, X2A shift register configuration 300, the X2A shift register configuration 400, and the X2B shift register configuration 500.

As depicted in FIGS. 2-5, the state of each generator can be expressed as a code vector word which specifies the binary sequence constant of each shift register as follows: (a) the vector consists of the binary state of each stage of the shift register, (b) the stage 12 value appears at the left followed by the values of the remaining states in order of descending stage numbers, and (c) the shift direction is from lower to higher stage number with stage 12 providing the current output. The code vector convention represents the present output and 11 future outputs in sequence. Using this convention, at each X1 epoch, the X1A shift register can be initialized to code vector 001001001000 and the X1B shift register can be initialized to code vector 010101010100. The first chip of the X1A sequence and the first chip of the X1B sequence occur simultaneously in the first chip interval of any X1 period.

The natural 4096 chip cycles of these generating sequences are shortened to cause precession of the X1B sequence with respect to the X1A sequence during subsequent cycles of the X1A sequence in the X1 period. Re-initialization of the X1A shift register produces a 4092 chip sequence by omitting the last 4 chips of the natural 4096 chip X1A sequence. Re-initialization of the X1B shift register produces a 4093 chip sequence by omitting the last 3 chips of the natural 4096 chip X1B sequence. This results in the phase of the X1B sequence lagging by one chip for each X1A cycle in the X1 period.

The X1 period is defined as the 3750 X1A cycles (15,345,000 chips) which is not an integer number of X1B cycles. To accommodate this situation, the X1B shift register is held in the final state (chip 4093) of its 3749th cycle. It remains in this state until the X1A shift register completes its 3750th cycle (343 additional chips). The completion of the 3750th X1A cycle establishes the next X1 epoch, which re-initializes both the X1A and X1B shift registers, starting a new X1 cycle.

The X2i sequences can be generated by first producing an X2 sequence and then delaying it by a selected integer number of chips, i, ranging from 1 to 37. Each of the X2i sequences is then modulo-2 added to the X1 sequence thereby producing up to 37 unique P(t) sequences.

The X2A and X2B shift registers of FIGS. 4 and 5 respectively, can be used to generate X2, and operate in a similar manner to the X1A and X1B shift registers of FIGS. 2 and 3, respectively. That is, X1A and X1B shift registers can be short-cycled, X2A to 4092 and X2B to 4093, so that X1A and X1B shift registers have the same relative precession rate as the X1 shift registers, such as X1A and X1B shift registers of FIGS. 2 and 3. X2A epochs can be counted to include 3750 cycles and X2B can be held in the last state at 3749 cycle until X2A of FIG. 4 completes its 3750th cycle. The polynomials for X2A and X2B shift registers of FIGS. 4 and 5, as referenced to the shift register input, can be:

$X2A: 1+x^1+x^3+X^4+x^5+x^7+x^8+x^9+x^{10}+x^{11}+x^{12}$, and $X2B: 1+x^2+x^3+x^4+x^8+x^9+x^{12}$.

In one aspect, the initialization vector for X2A is 100100100101 and for X2B is 010101010100). The X2A and X2B epochs can be made to process with respect to the X1A and X1B epochs by causing the X2 period to be 37 chips longer than the X1 period. When the X2A is in the last state of its 3750th cycle and X2B is in the last state of its 3749th cycle, their transitions to their respective initial states are delayed by 37 chip time durations.

At the beginning of the GPS week, X1A, X1B, X2A and X2B shift registers, as illustrated in FIGS. 2-5, can be initialized to produce the first chip of the week. The precession of the shift registers with respect to X1A continues until the last X1A period of the GPS week interval. During this particular X1A period, X1B, X2A and X2B of FIGS. 3-5 can be held when reaching the last state of X1B, X2A and X2B of FIGS. 3-5 respective cycles until that X1A cycle is completed, which can be more clearly depicted in the P-Code Reset Timing Table of FIG. 7. That is, FIG. 7 depicts the end-of-week reset timing and final code vector states. At this point, all four shift registers, such as X1A, X1B, X2A and X2B shift registers of FIGS. 2-5, can be initialized and provide the first chip of the new week. Also, a signal component timing for 37 unique P code phases is depicted in FIG. 6.

As depicted above, the PRN code sequences may use chained LFSR as bases for PRN code sequence generation in a GNSS system. The LFSR based PRN codes may be short, such as 511 bits to 2 kilobits (Kb) code sequences and durations, such as 1 milliseconds (ms). Some PRN codes may be longer in the definition of the PRN code sequences. As such, the present technology provides an optimized implementation using a hardware/firmware based waveform generation (e.g., PRN code combining) for a transmitter and receiver applications, for initialization and configuration implementations of a LFSR in a general purpose processor for pre-generating PRN code sequences stored in memory while reducing a system memory requirement. That is, the PRN code generator may use one or more processors and memory with one or more LFSRs, implemented therein, having any number of stages, polynomial representations, initialization values, and PRN code lengths. The PRN code generator may be based on a PRN spreading code sequence generation requirement specified as a bit-by-bit generation operation (e.g., algorithm).

In one aspect, the optimized PRN code generation implementation may perform a task an byte, word, and long word boundary byte aligned processing (e.g., for the block chip size for GPS P code 4096 bits block size, would require only 64 loops of long word (64 bits) operation). The optimized implementation in the processor and memory support real-time and/or non real-time generation of PRN spreading code sequences. Also, a block of PRN code chips may be generated in one execution pass and a block-sized lookup table may be used to reduce repetitive chip-by-chip table lookup. In one aspect, FIG. 10 shows the pre-generated GPS L2 $C_M$ and $C_L$ LFSR table look up that can chain (through the 32 bit size "Next States" column) the first 8 bits LFSR output ("Output (8 bits)" column) from the initialized LFSR states (32 bits size "LFSR States" column) to the next 8 bit PRN code output. That is, the present technology efficiently generates a block (in sample case, 8 bits) of PRN code chips in one execution pass through with minimal GPP machine instructions to reduce a number of repetitive chip-by-chip processing by factor of a block size multiple by the number of repetitive within each LFSR shifting. Moreover, the present technology provide additional efficiency gain by operation of PRN code generation in block size that falls on byte boundary (for reducing a number of computing instructions generated for execution when compared with non-byte boundary processing.)

Thus, in one aspect, as described in FIG. 8, the present technology is provided for generation of linear feedback shift register based PRN spreading code sequence using a general purpose process (GPP) device in a computing system is disclosed. In one aspect, the GPP may configured to receive a plurality of waveform generation parameters, select between a short PRN cycle and a long PRN cycle according to at least one of the plurality of waveform generation parameters and emulate a plurality of linear feedback shift registers (LFSR) for generating a block of PRN code chips.

Turning now to FIG. 8, a flowchart of an example method 800 for dynamic and optimized generation of linear feedback shift register based PRN spreading code sequence using a GPP device in accordance to an example of the present technology. The functionality may be implemented as a method and executed as instructions on a machine, where the instructions are included on at least one computer readable medium or one non-transitory machine-readable storage medium. For example, starting in block 810, an optimal PRN processing block chip size may be determined for the GPP. The block sizes may be selected as an 8 chip block size, a 16 chip block size, a 32 chip block size, a 64 chip block size, or a 128 chip block size. As in block 820, specific PRN spreading code waveform generation requirements, such as a PRN code frequency, PRN generation steps, a data message rate, a code length, an LFSR initial state, a number of LFSR, LFSR tabs, an LFSR table, an LFSR short cycle, a phase offset (e.g., a 90 degrees phase offset), a binary offset carrier (BOC) type, a subcarrier frequency, may be extracted and/or received. As in block 830, a short PRN code cycle or a long PRN code cycle may be determined according to at least one of the PRN spreading code waveform generation requirements. That is, the PRN generation type, such as a PRN short code that has a short repeating cycle that uses more memory but consumes less central processor unit throughput (as compared with the PRN long code cycle) or a PRN long code that has a long repeating cycle and uses less memory but consumes more central processor unit throughput (as compared with the PRN short code cycle), can be determined.

If the short PRN code cycle that uses more memory but consumes less central processor unit throughput compared to the long PRN code cycle is determined, the method 800 executes the short PRN cycle and may use more memory, but uses less processing throughput, as in block 850. Alternatively, if the long PRN cycle that has a long repeating cycle and uses less memory but consumes more central processor unit throughput, as compared with the PRN short code cycle, is determined, the method 800 executes the long PRN code cycle and may use less memory, but uses more processing throughput, as in block 840. In other words, a breakpoint between the short PRN cycle and the long PRN cycle requires a tradeoff of available computing system memory and throughput as compared to an overall allocation for the short PRN cycle and the long PRN cycle. It should be noted that from block 840, the method 800 may move to FIGS. 12-13. From block 850, the method 800 may move to FIGS. 9-11.

Turning now to FIG. 9, a flowchart of an example method 900 for using a short PRN code cycle according to waveform generation parameters in accordance to an example of the present technology is depicted. The functionality may be implemented as a method and executed as instructions on a machine, where the instructions are included on at least one computer readable medium or one non-transitory machine-readable storage medium. For example, starting in block 910, each PRN code includes one or more "n" number of LFSR and varying feedback tabs settings. A short cycle PRN code allows inclusion of pre-generated generalized lookup tables to be used at startup or initialization to generate PRN code sequence to minimize a GPP throughput during a startup and/or initialization operation. The pre-generated generalized lookup tables, for each of $2^n$ possible states, as indicated above in FIG. 10, can include the following elements: a) an 8-chip LFSR output table (as opposed to other workarounds of 1-chip output table), account of any skip bits as indicated in civil-moderate code ($C_M$) of FIG. 11, and 2) a next LFSR register state after the 8th chip.

The method 900 may execute the startup operation and/or the initialization operation process, as in block 920. Moving to block, 930, for each PRN's LFSR, the LFSR PRN sequence may be generated based on LFSR initial state value per at least one of the PRN spreading code waveform generation requirements, configurable code length and/or short PRN cycle, and each one of: 1) setting the current register equal to the initial state (e.g., Current_Register=Initial_State), 2) setting a block size index equal to zero (e.g., BlockSize_Index=0), 3) using a block size lookup table (e.g., Lkup_Table[Current_Register]) entry to build one block size array with 8 bits output chips, 4) set the current LFSR to the next LFSR state (e.g., Current_Register to Next_Register_State), 5) append the output bit to a PRN code block size index (e.g., Output_Bit to PRN_Code [BlockSize_Index]), 6) repeat steps 1-5 until code length/short PRN cycle is reach, and 7) zero fill until the end of block size array is reached, which is more clearly depicted in FIG. 11.

As in block 940, after generating the PRN code, a determination is made if there are additional PRN code requirements, such as adding or combining two strings of LFSR bits as shown in FIG. 11 (combining $C_M$ with $C_L$ bit stream into a single L2C PRN).

If there are additional PRN code requirements, the LFSR sequences can be combined per the additional PRN code requirements by performing, if required (e.g. see FIG. 11, L2C). The following optimization methods can be used to efficiently to align or offset PRN codes when required by block 950: 1) shift LFSR in block size increment, 2) shift the remaining sub block size in byte increment, 3) shift remaining bits, 4) include in the determination any phase offset or delay into LFSR shift process 1) to 3), and 5) generate a data bit "1" sequence by XORing "FF . . . FF" with PRN codes sequence if message data modulation is required. If there are no additional PRN code requirements, moving to block 960, the method 900 may execute and run in real time for PRN code generation. As in block 970, the PRN code segment is outputted based on an output time "t" and the message data bit applicable to the time "t". The method 900 may end, as in block 980.

FIG. 10 is an illustration of a Linear Shift Feedback Register (LSFR) lookup table 1000 in accordance with example implementations of the present disclosure. More specifically, FIG. 10 illustrates the 27 stages L2 $C_M$ and $C_L$ LFSR 1004 having a numerical value indicating the number of shifts, the feedback tabs, and the shift direction of the LSFR to reach the output 1010.

In operation, the LFSR 1004 are shift registers through which the binary data moves serially (as shown by the shift direction). During each cycle of data transfer, an input bit from the output feedback tab is fed back into the first cell 1014 and all other tab locations of the LFSR 1004, and each bit in the LFSR 1004 shifts down one cell. The bit in the last cell is shifted out of the LFSR 1004 as output bit 1010. It should be noted that when referring to the number of cells in an LFSR 1004, the term "number of bits" can be used to convey the same meaning. The input to an LFSR 1004 can be a combination of the LFSR's output bit 1010 and one or more of the bits in predetermined cells (referred to as "taps") of the register, with the combination being fed back as the next input bit. For example, the bits to be combined may be compared using what is referred to as an "exclusive OR" operation, in which a binary zero results from the combination when the bits are of equal value, and a binary one results when the bits are unequal. (It should be noted that the shown numbers "3", "2", or "1" therein for each block label represent the existence of 3, 2, or 1 consecutive cells or stages. For example, each cell, starting with the first cell 1014 is shown with the numerical values of 3 bits or stage, the second 3 represents the fourth thru sixth bit or stage, and so on until the final 3 block represent with the next 3 bits going to the output bit 1010).

In one aspect, the LFSR lookup table 1002 includes LFSR states 1008, an output 1010 (e.g., 8 bits), and a next state 1012 of the LFSR. The LFSR states 1008, the output 1010 (e.g., 8 bits), and the next state 1012 are each depicted in the LFSR state table 1006 and corresponding LFSR lookup table 1002 that related to the LFSR 1004 shift registers.

Corresponding to the generalized LFSR lookup table 1002, the LFSR state table 1006 is depicted. In one aspect, the LFSR state table 1006 includes the LFSR stages' states 1008, the output 1010 (e.g., 8 bits) after 8 shifts, and the next state 1012. The taps of the LFSR state table 1006 are shown at bits 3, 6, 8, 11, 14, 16, 18, 21-24, and 27 of the 27 stages (e.g., 1-27). In other words, the first cell 1014 of the LFSR 1004 indicates 3 shifts or 3 bits depicting the state of each register, which is shown in the LFSR state table 1006 at 3 (tap). The next cell indicates a shift of "3" bits and the LFSR state table 1006 shows the shift from 4 and 5 to the third bit "6" or 6 (tap). Thus, by reading each cell of the LFSR 1004, starting with the first cell 1014, each shift and state of the LFSR 1004 may be illustrated and determined in the LFSR state table 1006.

As an example illustration, the LFSR state table 1006 depicts the bit patterns of the LFSR states 1008 as 76C_3226 hex, the output 1010 for 8 iterations of the LSFR 1004 as 6D hex, and the next state 1012 is 30C_5A4F hex, each of which are indicated in the generalized LFSR lookup table 1002. As such, the generalized LFSR lookup table 1002 allows the technology described herein, to be pre-generated and populated using the GPP and generating a PRN code sequence using the generalized LFSR lookup table 1002 to generate intermediary PRN code subsequences based on each PRN code's nth number of LFSR and varying feedback tabs settings, as indicated in FIG. 9 blocks 910 and 920.

Turning now to FIG. 11, a GPS L2C PRN code including message data bit modulated is generated using a GPP device in a computing system is disclosed as example of the present innovation. At a startup operation or initializations operation for the short PRN cycle and the long PRN cycle, as illustrated in FIG. 9 blocks 930, for each PRN's LFSR, the LFSR PRN sequence may be generated based on LFSR initial state value per at least one of the PRN spreading code waveform generation requirements, configurable code length and/or short PRN cycle, and each one of: 1) setting the current register equal to the initial state, 2) setting a block size index equal to zero, 3) using a block size lookup table entry to build one block size array with 8 bits output chips, 4) set the current LFSR to the next LFSR state, 5) append the output bit to a PRN code block size index, 6) repeating 1-5 until code length/short PRN cycle is reach, and 6) zero fill until the end of block size array is reached. Moreover, if after generating the PRN code, additional PRN code requirements, FIG. 11 depicts adding or combining two strings of LFSR bits. In addition for L2 $C_M$ PRN, a data bit "1" sequence can be generated by XORing "FF . . . FF" with L2 $C_M$ PRN codes sequence to be use during startup initialization processing as described below in FIG. 11.

As depicted in FIG. 11, a L2C can transmit medium length pseudo-code (called "$C_M$ code" 1106) with message data modulated, and long-period pseudo-code (called $C_L$ code 1108). These codes allow a device to differentiate between satellites that are all transmitting on the same frequency. For example, the $C_M$ code is 20 milliseconds (ms) repeating PRN, and the $C_L$ code is 1.5 seconds long. In one aspect, the present innovation takes advantage of the L2C navigational message symbol rate of 20 ms per symbol to pre-generate two L2C PRN code sequences, one with data bit "1" L2 $C_M$ PRN codes sequence generated in the last part [68] or the original data bit "0" L2 $C_M$ PRN in combining with L2 $C_L$ code. In one aspect, the $C_M$ code 1106 (including the modulated data bit) and the $C_L$ code 1108 can be added or mixed together by means of a time-division multiplexing operation. However, the $C_M$ code 1106 and the $C_L$ code 1008 are in different phases of the PRN code.

For example, consider the $C_M$ code 1106 with a 27 stage LFSR, such as described in FIG. 10, may be employed. Out of the 1, 536,000 bits 1102 (or block of code) every 1.5 seconds, the first 20,460 bits (or block of code) or 20 milliseconds can include a repeating series of an LSFR output bit (labeled as "b" in FIG. 11) followed by a zero-fill bit (labeled as "0" in FIG. 11) to account for the phasing of the PRN code. Following the first 20,460 bits, 20 ignore bits (labeled with an "x" in FIG. 11) are included. Hence, the 20460 bits and the 20 ignore bits can be aligned to 64 bits 1104. This is then duplicated, for example, 74 times in order to reach the 1,536,000 bits 1102 to align with the $C_L$ code length.

For the $C_L$ code 1108, a 27 stage LFSR, such as described in FIG. 10, may also be employed, but now short cycle to 15,345,000 bits instead of 10230 for $C_M$ code. Out of 1, 536,000 bits 1102, the first 20,460 bits can include a repeating series of a zero-fill bit (labeled as "0" in FIG. 11) followed by an LSFR output bit (labeled as "b" in FIG. 11). In other words, the repeating pattern for the $C_L$ code 1108 are opposite phasing of the repeating pattern of the $C_M$ code 1106. Following the first 20,460 bits, 20 ignore bits (labeled with an "x" in FIG. 11) may also be included. Hence, the 20460 bits and the 20 ignore bits are aligned to 64 bits 1104 for the $C_L$ code 1106 as is also done for the $C_M$ code 1108. This can continue for each subsequent 10230 $C_L$ bits, for example, 74 times in order to reach the 1,536,000 bits 1102.

In one aspect, the two modulated message data bit "1" or "0" $C_M$ code 1106 and the applicable $C_L$ code segment 1108 may be combined together to create the L2C code 1110 for use during real time operation. This can produce a series of final output bits including modulation of navigational message data bit (labeled as "b" in FIG. 11). In other words, first bit "b" in the L2C code 1110 is from the $C_M$ code 1106 with a modulated navigational message data bit, the second bit "b" in the L2C code 1110 is from the $C_L$ code 1108, the third bit "b" in the L2C code 1108 is from the $C_M$ code with modulated navigational message data bit, 1106 and this adding continues for adding the $C_M$ code 1106 bits with the $C_L$ code 1108 bits to yield the L2C code 1108. In one aspect, the real time processing, such as for the L2C example, becomes selecting which (data bit "1" or data bit "0") pre-generated L2C$_M$ PRN sequence, based on an applicable data bit and which of the 75 20 ms segments from the L2C$_L$ 1.5 second PRN sequence, to send to the backend waveform generation hardware. This represent tremendous amount of processing improvement and efficiency prior to the present innovation.

Given that the zero fill bits are each placed in the $C_M$ code 1106 and the $C_L$ code 1108 after the 20,460 bits, the zero fill bits are in place, in both the $C_M$ code 1106 and the $C_L$ code 1108, to be added together to form the zero fill bits in the L2C 1110. Moreover, the bit positions may be 8-bit output bits, and may be packed into a Uint64 (unsigned integer 64 bit) to be used for each LFSR lookup table query, such as by using the generalized LFSR lookup table 1002 of FIG. 10. The packing may continue until all 64-Uint64's of a buffer is filled, as depicted in L2C 1110. The last remaining bits may be filled with don't-care bits or ignore bits, as needed. It should be noted, the backend hardware can be designed to configure so as to skip over the zero fill bits.

FIGS. 12 and 13 illustrate flowcharts of using long PRN cycle according to waveform generation parameters in accordance with example implementations of the present disclosure. That is, FIG. 12 depicts a PRN code generation long cycle PRN code algorithm. FIG. 13 depicts the PRN code generation long cycle PRN code implementation for a GPS P code PRN.

As in FIG. 12, the functionality may be implemented as a method 1200 and executed as instructions on a machine, where the instructions are included on at least one computer readable medium or one non-transitory machine-readable storage medium. For example, starting in block 1202, a startup and/or initialization operation may be performed. As in block, 1204, the block steps 910 and 920 of FIG. 9 may be executed to generate intermediary PRN code subsequences based on each PRN code's one or more "n" number of LFSR and varying feedback tabs settings. Real time cyclical processing is performed, as in block 1206. As in block 1208, the PRN code subsequences may be synchronized to a top of a desired time epoch by shift-rotating each PRN code subsequence n-bits, where n is based on 1) the desired time epoch, 2) a PRN identification (ID), and 3) a PRN code subsequence's length/short PRN cycle value. As in block 1210, for each PRN code, an n-bit sized portion of the PRN code sequence may be built using the intermediary PRN code subsequences (from block 1208), where n is derived from 1) a PRN's rate, and/or 2) a scheduled cycle time. A segment of n-bit PRN code sequence may now be generated using all required PRN code subsequences for a current PRN from block 1210, as in block 1212. As in block 1214, based on the short PRN cycle for each subsequence, the PRN codes subsequence may be shift-rotated after building each n-bit segment, which may account for any precession that may have occurred between the PRN code subsequences of different lengths. As in block 1216, special characteristics of each PRN subsequence may be accounted for (e.g., holding and sustaining the last bit for n-bits, delaying a PRN subsequence m-bits before resuming) and may perform similar shift-rotate handling from block 1214. The method 1200 may end, as in block 1218.

As in FIG. 13, the functionality may be implemented as a method 1300 and executed as instructions on a machine, where the instructions are included on at least one computer readable medium or one non-transitory machine-readable storage medium. For example, starting in block 1302, a startup and/or initialization operation may be performed using a GPP. As in block 1304, a general LFSR based lookup table(s) is generated using the GPP consisting of $2^n$ entries for all PRN's LFSR (e.g., where n equals 12 or 4096 entries for all P-code X1A, X1B, X2A, and X2B LFSR) and each table entry represents one of the $2^n$ possible LFSR states, with following attributes (e.g. see FIG. 1 and FIG. 7) of 1) 8-bit LFSR output (as opposed to the other software workarounds of 1-bit output table), and 2) a next LFSR register state after the 8th bit. As in block 1306, all applicable PRN LFSR output sequences may be generated with applicable initial setting (e.g. X1A, X1B, X2A, and X2B for the P code), which may use the LFSR lookup table from block 1304. For each LFSR lookup table query, the 8-bit output may be packed into a Uint64. The packing may continue until all 64-Uint64's of the buffer is filled, resulting in a total of 4096 bits. The last predetermined (e.g., the last 3 or 4) bits may be don't-care bits for X1B/X2B and X1A/X2A, respectively. The results can be 4092-bit buffers containing the X1A and X2A sequences, and 4093-bit buffers containing the X1B and X2B sequences (see FIG. 1 and FIG. 7). All four buffers can be considered to be in their initial states.

During a cyclic real time processing, as in block 1310, a determination is made to check if the top of a time epoch (1.5 seconds for Pcode) is reached. If yes, the current X2A and X2B block chips are identified and aligned as the head of the buffers of the X2A and X2B block chips and the X1A and X1B buffer may be re-initialized. If the desired time is not at the top of the time epoch, a determination is made to check if the X1B PRN short cycle is to be executed (by block 1314), as in block 1312. If yes, as in block 1314, the X1B's sustain the final block chip value for 343 bits. Next, a determination is made to check if the X2B PRN short cycle is to be executed and/or if X2B is to be delayed, as in block 1318. If yes, the X2B's final block chip value may be sustained for the final 343 bits and/or the X2A and X2B may be delayed for 37 bits, as in block 1316.

From block 1316, a determination is made if the X2B PRN code sequence is complete, as in block 1322. If yes, the X2A and X2B buffers may be shift-rotated in preparation for a next iteration, as in block 1324. Moving from either block 1322 (if no), block 1324, and/or from block 1318 (if no), the following may be executed, as in block 1320, 1) X1A xor X1B to generate 4092 bits of PX1, 2) X2A xor X2B to generate 4092 bits of PX2, and 3) PX1 xor PX2 to generate 4092 bits of the 400 microsecond sequences of P code relative to the desired time segment. As in block 1326, X1B and X2B may be shift-rotated by 1-bit in order to process the 4093rd bit in the next iteration. The method 1300 may end, as in block 1328.

FIG. 14 is an additional flowchart for dynamic optimization for generation of linear feedback shift register based PRN spreading code sequence using a processor device in according to an example of the present technology. The functionality may be implemented as a method 1400 and executed as instructions on a machine, where the instructions are included on at least one computer readable medium or one non-transitory machine-readable storage medium. For example, starting in block 1410, one or more waveform generation parameters may be received. As in block 1420, an operation is executed for selecting between a short PRN cycle and a long PRN cycle according to at least one of the waveform generation parameters. As in block 1430, one or more LFSR may be emulated for generating a block of PRN code chips.

It should be noted, that in FIGS. 8-14, one or more logic instructions may determine a chip block size according to a speed of a processor of the computer system. The chip block size may be selected from a plurality of chip block sizes that includes at least one of an 8 chip block size, a 16 chip block size, a 32 chip block size, a 64 chip block size, or a 128 chip block size. A memory usage and a central processing unit usage may be determined based on at least one of the plurality of waveform generation parameters for selecting between the short PRN cycle and the long PRN cycle. An output bit may be iteratively generated for a PRN code sequence using an LFSR table. That is, an output bit for a PRN code sequence may be iteratively generated using an LFSR table and a PRN code sequence may zero fill a bit up to a determined chip block size for emulating the LFSR. A PRN code sequence may be generate using an LFSR table at one of a startup operation or initializations operation for the short PRN cycle and the long PRN cycle.

Thus, as described herein, systems and methods are provided for optimizing the generation of a GNSS code sequence in a computer system that uses a general purpose processor that 1) receives a plurality of waveform generation parameters, 2) selects between a short PRN cycle and a long PRN cycle according to at least one of the plurality of waveform generation parameters, and 3) emulates a plurality of LFSR for generating a block of PRN code chips. The plurality of waveform generation parameters include at least one of a PRN code frequency, an LFSR initial state, a phase offset, a data message rate, a number of the plurality of LFSR, or an LFSR table. The GPP determines a chip block size according to a speed of a processor of the computer system. The chip block size can be selected from a plurality of chip block sizes that includes at least one of an 8 chip block size, a 16 chip block size, a 32 chip block size, a 64 chip block size, or a 128 chip block size.

In one aspect the GPP determines a memory usage and a central processing unit usage based on at least one of the plurality of waveform generation parameters for selecting between the short PRN cycle and the long PRN cycle. The GPP iteratively generates an output bit for a PRN code sequence using an LFSR table. That is, the GPP iteratively generates an output bit for a PRN code sequence using an LFSR table and zero filling a PRN code sequence bit up to a determined chip block size for emulating the plurality of LFSR. The GPP generates a PRN code sequence using an LFSR table at one of a startup operation or initializations operation for the short PRN cycle and the long PRN cycle.

As such, the present technology 1) efficiently generates a block of PRN code chips in one execution pass through to reduce a number of repetitive chip-by-chip processing factor by block size, 2) takes advantage of the use of the GPP byte boundary execution efficiency by generation of PRN code sequence in a block size that falls on byte boundary, which reduces the number of machine instructions generated for execution when compared with non-byte boundary processing, and 3) the implementation of block size table driven lookup operations further reduce the number of repetitive chip-by-chip table lookup to reduce the throughput by another factor of block size of the lookup table. In this way, the technology described herein addresses the challenge of PRN code generation using the GPP via an algorithm and incorporated into a computing architecture of existing applications to support fast and efficient real-time and/or non-real time generate of one or more unique and fully configurable specified PRN spreading code sequences. That is, the GPP provides a key-missing element in a hardware/firmware configuration to fully support waveform generation defined in software. Also, the technology is particularly useful in space applications with moderate to high radiation requirements, which limit the speed and throughput of GPP. As an example of this technology efficiency, the described technology implemented on a spaceborne BAE 66 MHz RAD750 GPP required less than 3 milliseconds to generate 20 milliseconds worth of the following next generation GPS L1, L2, and L5 (i.e. L1Cd, L1Cp, L1P, L1 CA, and L1 NSM, L2C, L2P, L2 NSM, L5I, L5Q) code sequences with the GPS L1, L2, and L5 code sequences' respective navigational message data bit modulated onto the PRN.

FIG. 15 illustrates a computing device 1510 on which modules of this technology may execute. A computing device 1510 is illustrated on which a high level example of the technology may be executed. The computing device 1510 may include one or more processors 1512, such as a GPP that are in communication with memory devices 1520. The computing device may include a local communication interface 1518 for the components in the computing device 1510. For example, the local communication interface may be a local data bus and/or any related address or control busses as may be desired.

The memory device 1520 may contain modules 1524 that are executable by the processor(s) 1512 and data for the modules 1524. The modules 1524 may execute the functions described earlier. A data store 1522 may also be located in the memory device 1520 for storing data related to the modules 1524 and other applications along with an operating system that is executable by the processor(s) 1512.

Other applications may also be stored in the memory device 1520 and may be executable by the processor(s) 1512. Components or modules discussed in this description that may be implemented in the form of software using high programming level languages that are compiled, interpreted or executed using a hybrid of the methods.

The computing device may also have access to I/O (input/output) devices 1514 that are usable by the computing devices. An example of an I/O device is a display screen that is available to display output from the computing devices. Other known I/O device may be used with the computing device as desired. Networking devices 1516 and similar communication devices may be included in the computing device. The networking devices 1516 may be wired or wireless networking devices that connect to the Internet, a LAN, WAN, or other computing network.

The components or modules that are shown as being stored in the memory device 1520 may be executed by the processor 1512. The term "executable" may mean a program file that is in a form that may be executed by a processor 1512. For example, a program in a higher level language may be compiled into machine code in a format that may be loaded into a random access portion of the memory device 1520 and executed by the processor 1512, or source code may be loaded by another executable program and interpreted to generate instructions in a random access portion of the memory to be executed by a processor. The executable program may be stored in any portion or component of the memory device 1520. For example, the memory device 1520 may be random access memory (RAM), read only memory (ROM), flash memory, a solid-state drive, memory card, a hard drive, optical disk, floppy disk, magnetic tape, or any other memory components.

The processor 1512 may represent multiple processors and the memory 1520 may represent multiple memory units that operate in parallel to the processing circuits. This may provide parallel processing channels for the processes and data in the system. The local interface 1518 may be used as a network to facilitate communication between any of the multiple processors and multiple memories. The local interface 1518 may use additional systems designed for coordinating communication such as load balancing, bulk data transfer, and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

Many modifications and other implementations of the disclosure set forth herein will come to mind to one skilled in the art to which the disclosure pertains having the benefit of the teachings presented in the foregoing description and the associated drawings. Therefore, it is to be understood that the disclosure is not to be limited to the specific implementations disclosed and that modifications and other implementations are intended to be included within the scope of the appended claims. Moreover, although the foregoing description and the associated drawings describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation. Although various aspects of the disclosed technology have been shown and described, modifications may occur to those skilled in the art upon reading the specification. The present application includes such modifications and is limited only by the scope of the claims.

What is claimed is:

1. A system for generating a Global Navigation Satellite System (GNSS) code sequence in a computer system, the system comprising one or more logic circuits, configured to at least:
receive a plurality of waveform generation parameters;
select between a short pseudo-random noise (PRN) cycle and a long PRN cycle according to at least one of the plurality of waveform generation parameters; and
emulate a plurality of linear feedback shift registers (LFSR) for generating a block of PRN code chips used for generating said GNSS code sequence in said computing system.

2. The system of claim 1, wherein the plurality of waveform generation parameters include at least one of a PRN code frequency, an LFSR initial state, a phase offset, a data message rate, a number of the plurality of LFSR, or an LFSR table.

3. The system of claim 1, wherein the one or more logic circuits are further configured to determine a chip block size according to a speed of a processor of the computer system.

4. The system of claim 3, wherein the chip block size is selected from a plurality of chip block sizes that includes at least one of an 8 chip block size, a 16 chip block size, a 32 chip block size, a 64 chip block size, or a 128 chip block size.

5. The system of claim 1, wherein the one or more logic circuits are further configured to determine a memory usage and a central processing unit usage based on at least one of the plurality of waveform generation parameters for selecting between the short PRN cycle and the long PRN cycle.

6. The system of claim 1, wherein the one or more logic circuits are further configured to iteratively generate an output bit for a PRN code sequence using an LFSR table.

7. The system of claim 1, wherein the one or more logic circuits are further configured to iteratively generate an output bit for a PRN code sequence using an LFSR table and zero filling a PRN code sequence bit up to a determined chip block size for emulating the plurality of LFSR.

8. The system of claim 1, wherein the one or more logic circuits are further configured to generate a PRN code sequence using an LFSR table at one of a startup operation or initializations operation for the short PRN cycle and the long PRN cycle.

9. A method of generating a Global Navigation Satellite System (GNSS) code sequence in a computer system, the method comprising:
receiving a plurality of waveform generation parameters;
selecting between a short pseudo-random noise (PRN) cycle and a long PRN cycle according to at least one of the plurality of waveform generation parameters; and
emulating a plurality of linear feedback shift registers (LFSR) for generating a block of PRN code chips used for generating said GNSS code sequence in said computing system.

10. The method of claim 9, wherein the plurality of waveform generation parameters include at least one of a PRN code frequency, an LFSR initial state, a phase offset, a data message rate, a number of the plurality of LFSR, or an LFSR table.

11. The method of claim 9, further comprising determining a chip block size according to a speed of a processor of the computer system.

12. The method of claim 11, wherein the chip block size is selected from a plurality of chip block sizes that includes at least one of an 8 chip block size, a 16 chip block size, a 32 chip block size, a 64 chip block size, or a 128 chip block size.

13. The method of claim 9, further comprising determining a memory usage and a central processing unit usage based on at least one of the plurality of waveform generation parameters for selecting between the short PRN cycle and the long PRN cycle.

14. The method of claim 9, further comprising iteratively generating an output bit for a PRN code sequence using an LFSR table.

15. The method of claim 9, further comprising iteratively generating an output bit for a PRN code sequence using an LFSR table and a zero filling a PRN code sequence bit up to a determined chip block size for emulating the plurality of LFSR.

16. The method of claim 9, further comprising generating a PRN code sequence using an LFSR table at one of a startup operation or initializations operation for the short PRN cycle and the long PRN cycle.

17. A method of providing security in a computer system, the method comprising:
receiving a plurality of waveform generation parameters;
selecting between a short pseudo-random noise (PRN) code sequence cycle and a long PRN code sequence cycle according to at least one of the plurality of waveform generation parameters; and
emulating a plurality of linear feedback shift registers (LFSR) for generating a block of PRN code chips, used for providing security in said computer system, by iteratively generating an output bit for a PRN code sequence using an LFSR table and zero filling a PRN code sequence bit up to a determined chip block size.

18. The method of claim 17, further comprising determining an optimal chip block size according to a speed of a processor of the computer system that is at least one of an 8 chip block size, a 16 chip block size, a 32 chip block size, a 64 chip block size, or a 128 chip block size.

19. The method of claim 17, further comprising zero filling a PRN code sequence bit to round out a chip block size align in between a breakpoint of the long PRN code sequence cycle, wherein the plurality of waveform generation parameters that include at least one of a PRN code frequency, an LFSR initial state, a phase offset, a data message rate, a number of the plurality of LFSR, or an LFSR table for selecting between the short PRN cycle and the long PRN cycle.

20. The method of claim 17, further comprising generating the PRN code sequence using the LFSR table at one of a startup operation or initializations operation for the short PRN code sequence cycle and the long PRN code sequence cycle.

* * * * *